(12) United States Patent
Lee et al.

(10) Patent No.: US 11,683,602 B1
(45) Date of Patent: Jun. 20, 2023

(54) NINE CELL PIXEL IMAGE SENSOR WITH PHASE DETECTION AUTOFOCUS

(71) Applicant: OMNIVISION TECHNOLOGIES, INC., Santa Clara, CA (US)

(72) Inventors: Sangjoo Lee, Sunnyvale, CA (US); Rui Wang, San Jose, CA (US); Xuelian Liu, Sunnyvale, CA (US); Min Qu, Mountain View, CA (US); Liang Zuo, Milpitas, CA (US); Selcuk Sen, Mountain View, CA (US); Hiroaki Ebihara, San Jose, CA (US); Lihang Fan, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/716,856

(22) Filed: Apr. 8, 2022

(51) Int. Cl.
  *H04N 25/615* (2023.01)
  *H04N 25/133* (2023.01)
  *H04N 25/13* (2023.01)
  *H04N 25/447* (2023.01)

(52) U.S. Cl.
  CPC ....... *H04N 25/6153* (2023.01); *H04N 25/133* (2023.01); *H04N 25/134* (2023.01); *H04N 25/447* (2023.01)

(58) Field of Classification Search
  CPC ...... H04N 25/75; H04N 25/76; H04N 25/766; H04N 25/77; H04N 25/78; H04N 25/6153; H04N 25/133; H04N 25/134; H04N 25/447; H01L 27/14603; H01L 27/14607
  USPC ...................................................... 348/222.1
  See application file for complete search history.

(56) References Cited

U.S. PATENT DOCUMENTS

| | | | | |
|---|---|---|---|---|
| 2019/0205886 A1* | 7/2019 | Ramakrishnan | ....... | G06Q 20/10 |
| 2020/0036917 A1* | 1/2020 | Komai | .................. | H04N 25/75 |
| 2022/0328548 A1* | 10/2022 | Lee | ................... | H01L 27/14831 |
| 2022/0367540 A1* | 11/2022 | Saka | ...................... | H04N 23/60 |

* cited by examiner

*Primary Examiner* — Lin Ye
*Assistant Examiner* — Chan T Nguyen
(74) *Attorney, Agent, or Firm* — Perkins Coie LLP

(57) ABSTRACT

An imaging device includes a pixel array of 1×3 pixel circuits that include 3 photodiodes in a column. Bitlines are coupled to the 1×3 pixel circuits. The bitlines are divided into groupings of 3 bitlines per column of the 1×3 pixel circuits. Each column of the 1×3 pixel circuits includes a plurality of first banks coupled to a first bitline, a plurality of second banks coupled to a second bitline, and a plurality of third banks coupled to a third bitline of a respective grouping of the 3 bitlines. The 1×3 pixel circuits are arranged into groupings of 3 1×3 pixel circuits per nine cell pixel structures that form a plurality of 3×3 pixel structures of the pixel array.

30 Claims, 12 Drawing Sheets

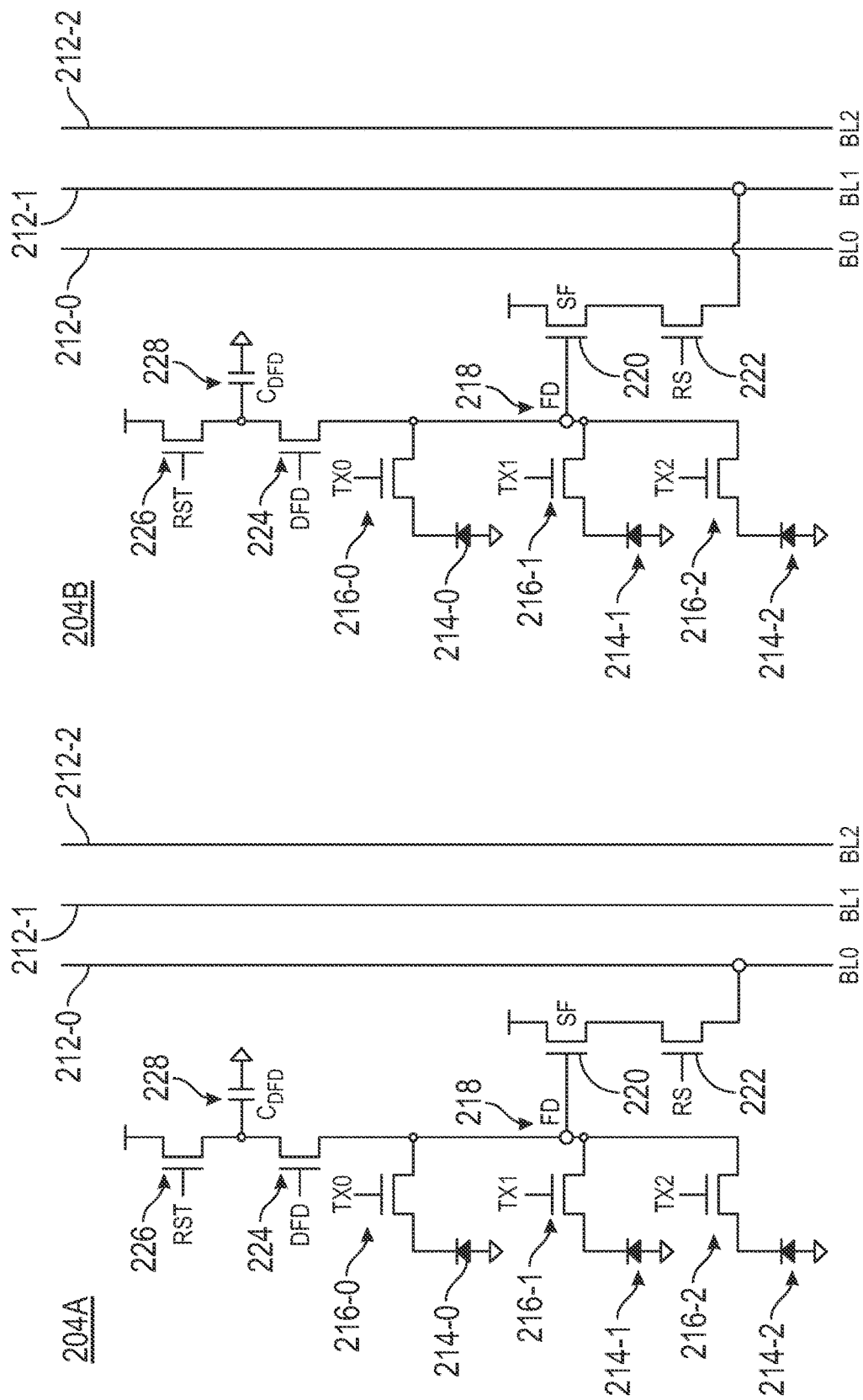

NINE CELL PIXEL IMAGE SENSOR WITH PHASE DETECTION AUTOFOCUS

BACKGROUND INFORMATION

Field of the Disclosure

This disclosure relates generally to image sensors, and in particular but not exclusively, relates to image sensors that include binned pixels with phase detection autofocus.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A illustrates one example of a schematic of a 1×3 pixel circuit coupled to a first bitline of a grouping of 3 bitlines per column of a pixel array in accordance with the teachings of the present disclosure.

FIG. 2B illustrates one example of a schematic of a 1×3 pixel circuit coupled to a second bitline of a grouping of 3 bitlines per column of a pixel array in accordance with the teachings of the present disclosure.

FIG. 6 illustrates a detailed diagram illustrating an example of a 9 cell binned readout of all of the banks of pixel circuits included in a pixel array without a readout of phase detection information in accordance with the teachings of the present disclosure.

FIG. 8 illustrates a detailed diagram illustrating another example of a 9 cell binned readout of all of the banks of pixel circuits included in a pixel array with a readout of phase detection information in accordance with the teachings of the present disclosure.

Figure 1:
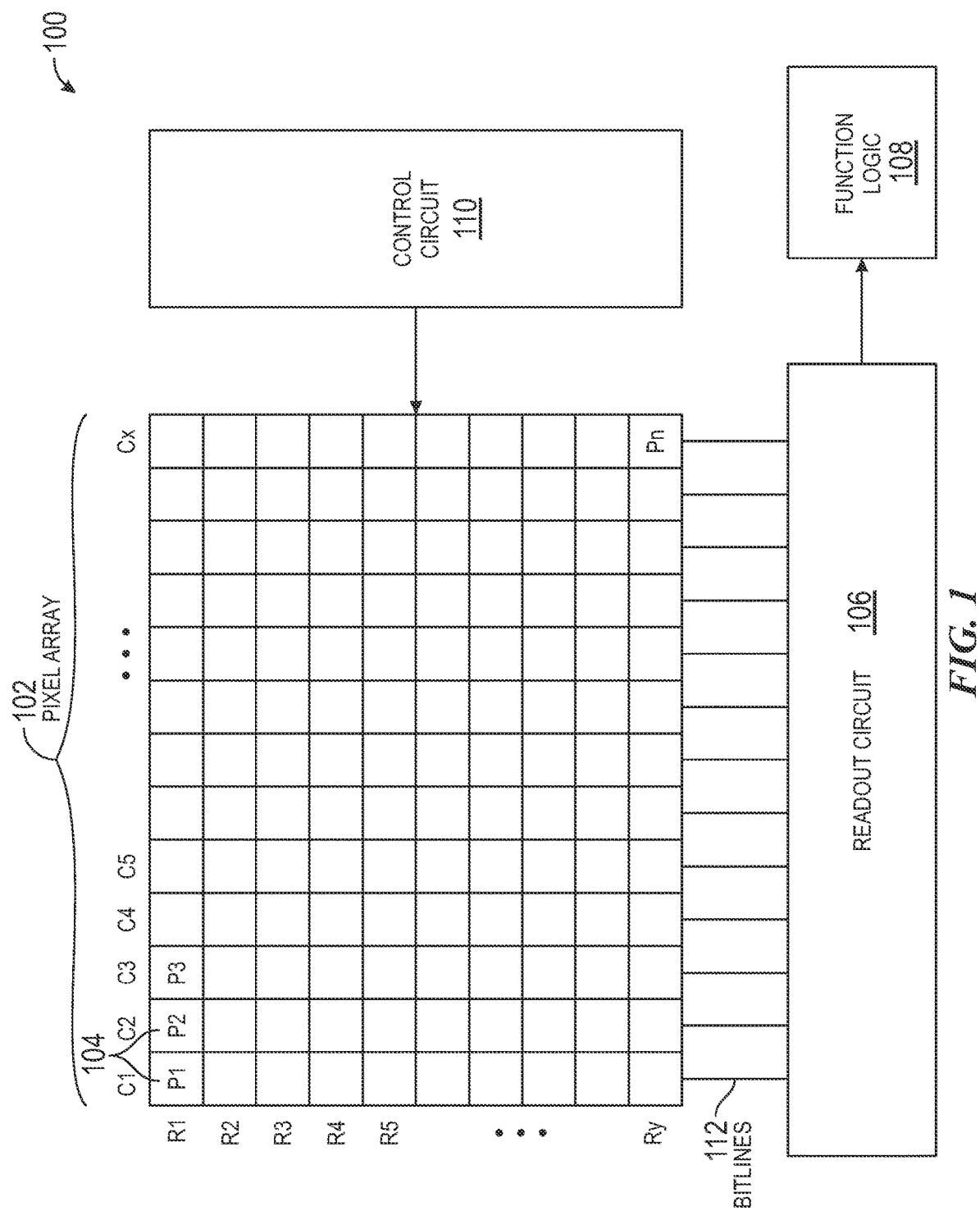
FIG. 1 illustrates one example of an imaging system including a pixel array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to imaging systems with 9 cell pixel image sensors including phase detection autofocus pixels are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with a plurality of 1×3 pixel circuits arranged in rows and columns of the pixel array. Each 1×3 pixel circuit includes 3 photodiodes that are arranged along a respective column. A plurality of bitlines is coupled to the plurality of 1×3 pixel circuits. The plurality of bitlines is divided in groupings of 3 bitlines per column of 1×3 pixel circuits. Each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines. The pixel array is further organized into a plurality of 9 cell (9C) pixel structures such that each of the 9C pixel structure includes 3 1×3 pixel structures, which form a 3×3 pixel structure.

In the various examples, a color filter array is disposed over the pixel array. In one example, the color filter array includes red, green, and blue color filters arranged in a mosaic pattern such as a Bayer color filter array such that each 9C pixel structure is under one of the color filters of the color filter array. In various examples, each 9C pixel structure is disposed under one of the color filters of the color filter array. In various examples the new 9C pixel structures are arranged into 2×2 groupings of 4 9C pixel structures, which form 6×6 pixel structures. As such, the four 9C pixel structures included in each 6×6 pixel structure are disposed under red, green, green, and blue color filters of the Bayer color filter array that is disposed over the pixel array. In various examples, the center 2×2 grouping of photodiodes included in the each 6×6 pixel structure may be configured to provide phase detection autofocus information from the pixel array.

As such, in the various examples, the pixel array may be configured to be read out as 9C binned pixels without phase detection information through all 3 bitlines per column simultaneously. In another example, the pixel array may be configured to be read out as 9C binned pixels with phase detection information through all 3 bitlines per column simultaneously. In yet another example, the pixel array may be configured to be read out as a full resolution or full sized readout. In the example, one of the 3 bitlines per column is active while the remaining 2 bitlines of the 3 bitlines per column are idle or not used during the full sized readout.

In various examples, the circuitry utilized to read out the pixel circuits of the pixel array include current sources and comparators coupled to the bitlines. In the examples, the bitlines are coupled to the comparators through routing circuitry. In the various examples, comparators are configured to compare bitlines coupled to pixel circuits either under green color filters or under blue or red color filters. As such, the routing circuitry is configured to swap or route the bitlines as appropriate so that the respective comparators are coupled to compare only pixel circuits under green color filters or compare only pixel circuits under blue or red color filters, depending on the particular rows of the pixel array that is being read out at the time.

To illustrate, FIG. 1 shows one example of an imaging system 100 including 1×3 pixel circuits and coupled through bitlines to a readout circuit with current sources, routing circuitry, and comparators in accordance with the teachings of the present invention. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, each pixel circuit 104 may include one or more photodiodes configured to photogenerate image charge in response to incident light. For instance, in one example, pixel circuit 104 may include 3 photodiodes such that each pixel circuit 104 is a 1×3 pixel circuit. As will be discussed, in various examples, there are 3 bitlines per column for each column of pixel circuits 104. The image charge generated in each photodiode is transferred to a floating diffusion included in each pixel circuit 104, which may be converted to an image signal, or in some circumstances to phase detection autofocus information, and then read out from each pixel circuit 104 by readout circuit 106 through column bitlines 112. As will be discussed, in the various examples, readout circuit 106 may be configured to read out 9C binned image data, phase detection autofocus data, and/or full resolution image data through column bitlines 112. In various examples, readout circuit 106 may include current sources, routing circuitry, and comparators that may be included in analog to digital converters or otherwise.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 104 is coupled to pixel array 102 to control operation of the plurality of photodiodes in pixel array 102. For example, control circuit 104 may generate a rolling shutter or a shutter signal for controlling image acquisition. In other examples, image acquisition is synchronized with lighting effects such as a flash.

In one example, imaging system 100 may be included in a camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

FIG. 2A illustrates one example schematic of a pixel circuit 204A included in an imaging system with a photodiode array in accordance with the teachings of the present invention. It is appreciated that the pixel circuit 204A of FIG. 2A may be an example of one of the pixel circuits 104 included in pixel array 102 as shown in FIG. 1, and that similarly named and numbered elements described above are coupled and function similarly below.

In the example depicted in FIG. 2A, pixel circuit 204A includes a photodiode 214-0 coupled to a transfer transistor 216-0, a photodiode 214-1 coupled to a transfer transistor 216-1, and a photodiode 214-2 coupled to a transfer transistor 216-2. Thus, each one of the plurality of transfer transistors 216-0 to 216-2 is coupled to a respective one of the plurality of photodiodes 214-0 to 214-2. In the depicted example, it is appreciated that the 3 photodiodes 214-0, 214-1, and 214-2 form a 1×3 pixel circuit 204A. In other words, in the various examples, the 3 photodiodes 214-0, 214-1, and 214-2 may be considered as one column of 3 rows of photodiodes, or a 1×3 pixel circuit 204A. As will be discussed below, in the various examples, the readout of the 3 photodiodes 214-0, 214-1, and 214-2 may be binned together or may be read out individually for a full resolution readout. In another embodiment, one of the 3 photodiodes 214-0, 214-1, and 214-2 may be read out to provide phase detection autofocus information.

Continuing with the depicted example, a shared floating diffusion 218 is coupled to transfer transistor 216-0, transfer transistor 216-1, and transfer transistor 216-2. As such, each one of the plurality of transfer transistors 216-0 to 216-2 is coupled between a respective one of the plurality of photodiodes 214-0 to 214-2 and shared floating diffusion 218. As such, floating diffusion 218 is a shared floating diffusion that is configured to receive charge that is transferred from the plurality of photodiodes 214-0 to 214-2.

In operation, transfer transistor 216-0 is coupled to be controlled in response to a transfer control signal TX0, transfer transistor 216-1 is coupled to be controlled in response to a transfer control signal TX1, and transfer transistor 216-2 is coupled to be controlled in response to a transfer control signal TX2. As such, charge photogenerated in photodiode 214-0 in response to incident light is transferred to shared floating diffusion 218 in response to transfer control signal TX0, charge photogenerated in photodiode 214-1 in response to incident light is transferred to shared floating diffusion 218 in response to transfer control signal TX1, and charge photogenerated in photodiode 214-2 in response to incident light is transferred to shared floating diffusion 218 in response to transfer control signal TX2.

In the example, a dual floating diffusion transistor 224 is also coupled to shared floating diffusion 218, and a dual floating diffusion capacitor $C_{DFD}$ 228 is coupled to dual floating diffusion transistor 224 as shown. In the example, the dual floating diffusion transistor 224 may be switched on and off in response to a dual floating diffusion signal DFD to switch between low conversion gain or high conversion gain readouts to increase the dynamic range of the image sensor. In the example, a reset transistor 226 is coupled between a voltage supply (e.g., AVDD) and the dual floating diffusion transistor 224. In operation, the reset transistor 226 is configured to reset pixel circuit 204A including the dual floating diffusion capacitor $C_{DFD}$ 228 and the charge in shared floating diffusion 218 in response to a reset control signal RST.

In the illustrated example, a gate of a source follower transistor 220 is coupled to the shared floating diffusion 218. In the example, the drain of the source follower transistor 220 is coupled to the voltage supply (e.g., AVDD), and the source of source follower transistor 220 is coupled to a first column bitline BL0 212-0 through a row select transistor 222. Thus, in other words, the source follower transistor 220 and the row select transistor 222 are coupled between the voltage supply (e.g., AVDD) and the first column bitline 212-0. In operation, the row select transistor 222 is configured to output a signal that is representative of the charge in shared floating diffusion 218 from the source follower transistor 220 of pixel circuit 204A to the first column bitline 212-0 in response to a row select signal RS.

As shown in the depicted example, there are 3 column bitlines per column of BL0 212-0, BL1 212-1, and BL2 212-2 per column of pixel cells 204A. As mentioned, pixel cell 204A is coupled to the first bitline BL0 212-0. As such, since pixel cell 204A is coupled to the first bitline BL0 212-0 of the 3 bitlines BL0 212-0, BL1 212-1, and BL2 212-2 per column of pixel cells, pixel cell 204A is considered to be included in a first grouping or a first bank of pixel cells, which is referred to as bank 0 in this disclosure. As will be shown in FIGS. 2B-2C below, a pixel cell 204B coupled to the second bitline BL1 212-1 of the 3 bitlines BL0 212-0, BL1 212-1, and BL2 212-2 per column of pixel cells is considered to be included in bank 1. Similarly, a pixel cell 204C coupled to the third bitline BL2 212-2 of the 3 bitlines BL0 212-0, BL1 212-1, and BL2 212-2 per column of pixel cells is considered to be included in bank 2.

To illustrate, FIG. 2B illustrates one example schematic of a pixel circuit 204B included in an imaging system with a photodiode array in accordance with the teachings of the present invention. It is appreciated that the pixel circuit 204B of FIG. 2B may be another example of one of the pixel circuits 104 included in pixel array 102 as shown in FIG. 1, and that similarly named and numbered elements described above are coupled and function similarly below.

It is further appreciated that the pixel circuit 204B of FIG. 2B shares many similarities with the pixel circuit 204A of FIG. 2A. For instance, there are 3 column bitlines BL0 212-0, BL1 212-1, and BL2 212-2 per column of pixel cells 204B. However, the difference between pixel circuit 204B of FIG. 2B and pixel circuit 204A of FIG. 2A is that in the pixel circuit 204B of FIG. 2B, the source of source follower transistor 220 is coupled to the second column bitline BL1 212-1 through a row select transistor 222 instead of the first column bitline BL0 212-0 of the 3 bitlines BL0 212-0, BL1 212-1, and BL2 212-2 per column of pixel cells as in pixel circuit 204A of FIG. 2A. In one example, pixel circuit 204A of FIG. 2A and pixel circuit 204B of FIG. 2B may be in the same column of the same pixel array with the same 3 column bitlines BL0 212-0, BL1 212-1, and BL2 212-2 per column of pixel cells 204B. However, since pixel cell 204B is coupled to the second bitline BL0 212-1, pixel cell 204B is considered to be included in a second grouping or a second bank of pixel cells, which is referred to as bank 1 in this disclosure.

Figures 2C, 2D:
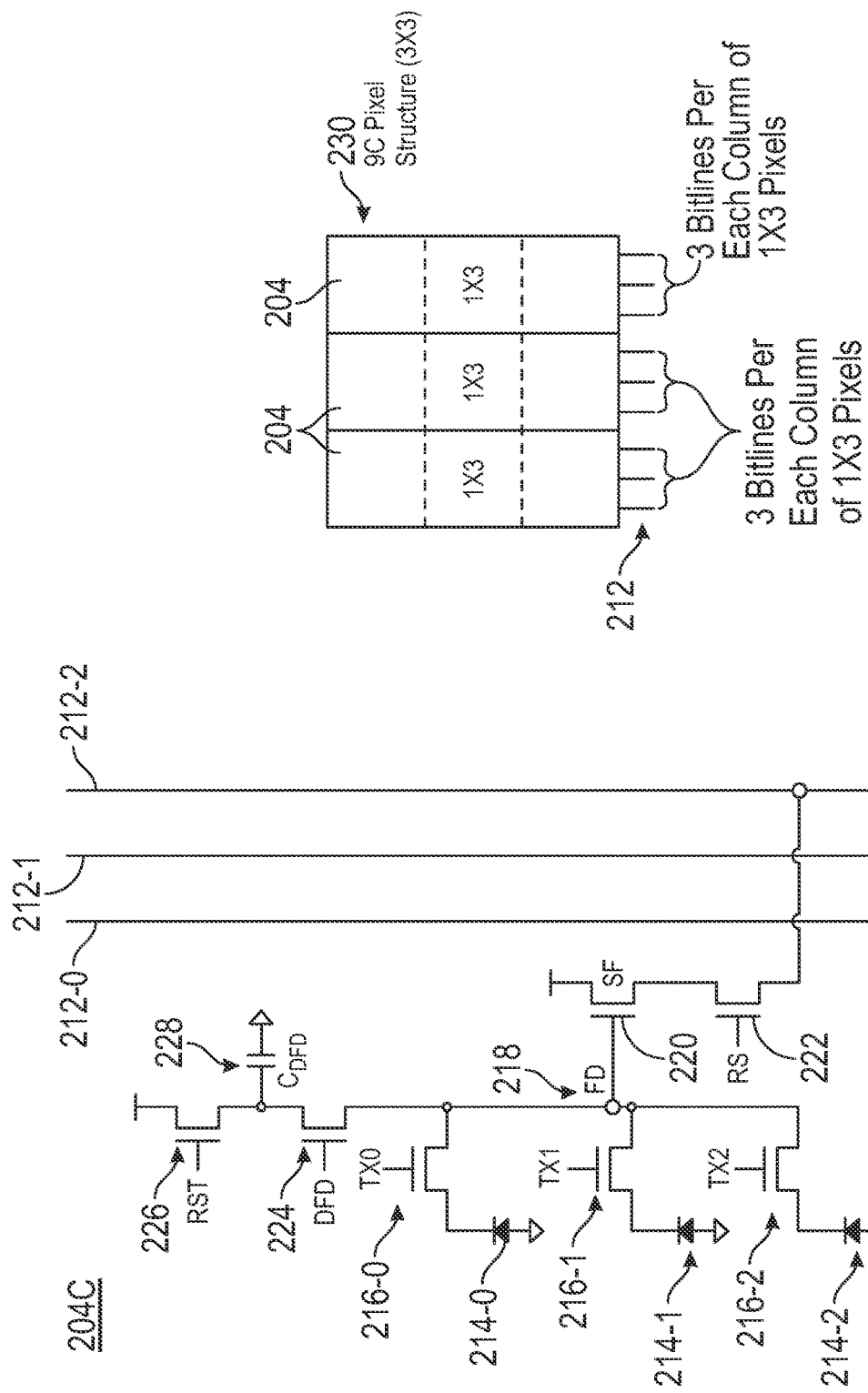
FIG. 2C illustrates one example of a schematic of a 1×3 pixel circuit coupled to a third bitline of a grouping of 3 bitlines per column of a pixel array in accordance with the teachings of the present disclosure.
FIG. 2D illustrates one example of a 9 cell 3×3 pixel structure including 3 1×3 pixel circuits of a pixel array in accordance with the teachings of the present disclosure.

FIG. 2C illustrates one example schematic of a pixel circuit 204C included in an imaging system with a photodiode array in accordance with the teachings of the present invention. It is appreciated that the pixel circuit 204C of FIG. 2C may be yet another example of one of the pixel circuits 104 included in pixel array 102 as shown in FIG. 1, and that similarly named and numbered elements described above are coupled and function similarly below.

It is further appreciated that the pixel circuit 204C of FIG. 2C shares many similarities with the pixel circuit 204B of FIG. 2B as well as the pixel circuit 204A of FIG. 2A. For instance, there are 3 column bitlines BL0 212-0, BL1 212-1, and BL2 212-2 per column of pixel cells 204C. However, the difference between pixel circuit 204C of FIG. 2C and pixel circuit 204B of FIG. 2B and pixel circuit 204A of FIG. 2A is that in the pixel circuit 204C of FIG. 2C, the source of source follower transistor 220 is coupled to the third column bitline BL2 212-2 through a row select transistor 222 instead of the second column bitline BL1 212-1 of the 3 bitlines BL0 212-0, BL1 212-1, and BL2 212-2 per column of pixel cells as in pixel circuit 204B of FIG. 2B, or instead of the first column bitline BL0 212-0 of the 3 bitlines BL0 212-0, BL1 212-1, and BL2 212-2 per column of pixel cells as in pixel circuit 204A of FIG. 2A. In one example, pixel circuit 204A of FIG. 2A, pixel circuit 204B of FIG. 2B, and pixel circuit 204C of FIG. 2C may be in the same column of the same pixel array with the same 3 column bitlines BL0 212-0, BL1 212-1, and BL2 212-2 per column of pixel cells 204C. However, since pixel cell 204C is coupled to the third bitline BL2 212-2, pixel cell 204C is considered to be included in a third grouping or a third bank of pixel cells, which is referred to as bank 2 in this disclosure.

FIG. 2D illustrates one example of a 9 cell 3×3 pixel structure 230 including 3 1×3 pixel circuits of a pixel array in accordance with the teachings of the present disclosure. Specifically, the example depicted in FIG. 2D shows a 9 cell (9C) pixel structure 230, which may be considered 3×3 pixel structure that includes 3 1×3 pixel circuits 204 arranged side by side as shown to form 3 columns and 3 rows of photodiodes. It is appreciated that the 3 1×3 pixel circuits 204 of FIG. 2B may be examples of pixel circuit 204A of FIG. 2A, of pixel circuit 204B of FIG. 2B, or of pixel circuit 204C of FIG. 2C, and that similarly named and numbered elements described above are coupled and function similarly below. As such, it is further appreciated that each of the 3 1×3 pixel circuits 204 include 3 bitlines (e.g., BL0 212-0, BL1 212-1, BL2 212-2) per column of 1×3 pixel circuits 204.

Figure 2E:
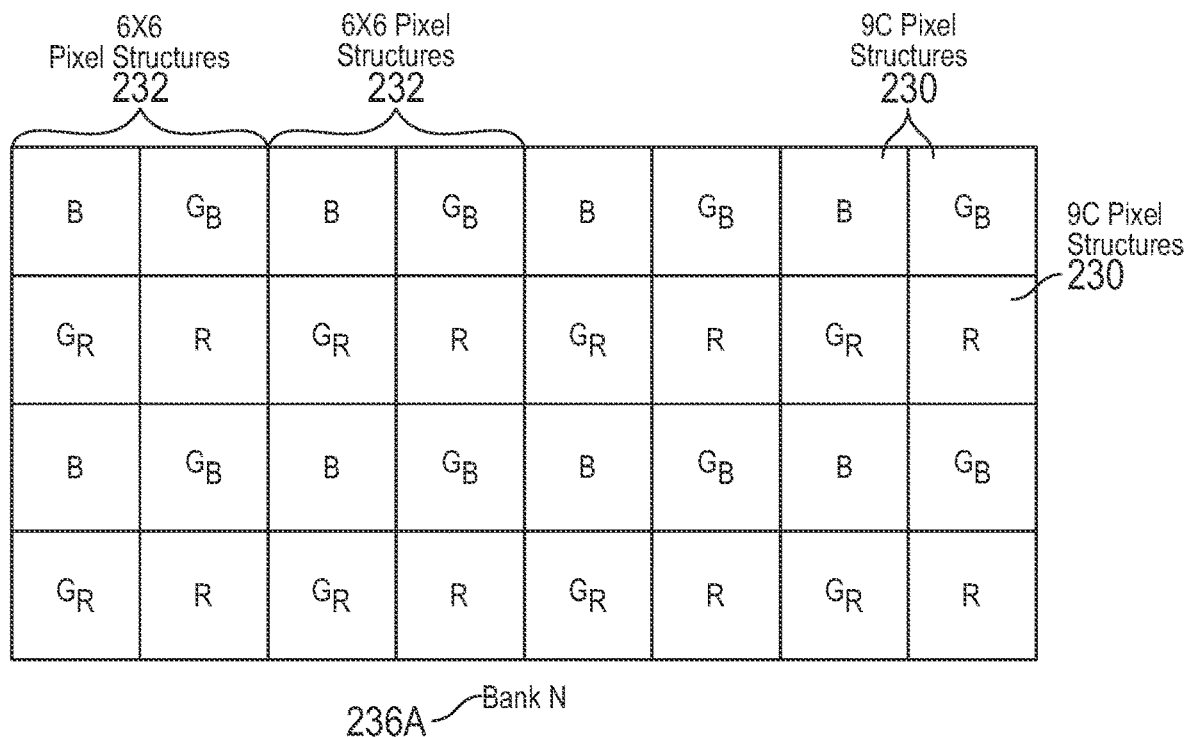
FIG. 2E illustrates one example of a bank of 9 cell 3×3 pixel structures of a pixel array in accordance with the teachings of the present disclosure.

FIG. 2E illustrates one example of a bank N 236A of 9 cell (9C) 3×3 pixel structures of a pixel array in accordance with the teachings of the present disclosure. In the various examples, bank N 236A includes 9C pixel structures 230 that are arranged in the rows and columns of the pixel array. It is appreciated that the 9C pixel structures 230 depicted in FIG. 2E may be examples of the 9C pixel structure 230 depicted in FIG. 2D, and that similarly named and numbered elements described above are coupled and function similarly below. In various examples, N=0, 1, or 2 (e.g., bank 0, bank 1, bank 2) such that the 1×3 pixel circuits included in each 9C pixel structure of bank N 236A are all coupled to either the first bitline BL0 212-0, the second bitline BL1 212-1, or the third bitline BL2 212-2 as discussed in detail above.

The example depicted in FIG. 2E also illustrates a color filter array disposed over the pixel array. In the example, the color filter array includes an array of color filters arranged in a mosaic of three colors such as red, green, and blue color filters. In one example, the color filter array may be a Bayer color filter array such that the color filters are arranged in a repeating pattern of 2×2 squares of color filters with repeating blue and green color filters in one row and repeating green and red color filters in a neighboring row.

As shown in the example illustrated in FIG. 2E, each one of the 9C pixel structures is disposed under one of the color filters of the color filter array. In the depicted example, blue color filters are indicated with a B label, the green color filters in the same rows as the blue color filters are indicated with a $G_B$ label, the red color filters are indicated with an R label, and the green color filters in the same rows as the red color filters are indicated with a $G_R$ label. As such, it is appreciated that the color filters along one diagonal of the pattern of 2×2 squares of color filters are blue (B) and red (R), while the color filters along the other diagonal of the pattern of 2×2 squares of color filters are both green ($G_B$ and $G_R$).

It is appreciated that each 2×2 square of color filters is disposed over a corresponding 2×2 square of 9C pixel structures 230. As such, since each 9C pixel structure 230 includes 3 1×3 pixel circuits 204 arranged side by side as discussed in FIG. 2D, each 2×2 square of color 9C pixel structures 230 forms a 6×6 pixel structure 232, which is formed with 4 9C pixel structures 230, or 12 1×3 pixel circuits 204.

Figure 2F:
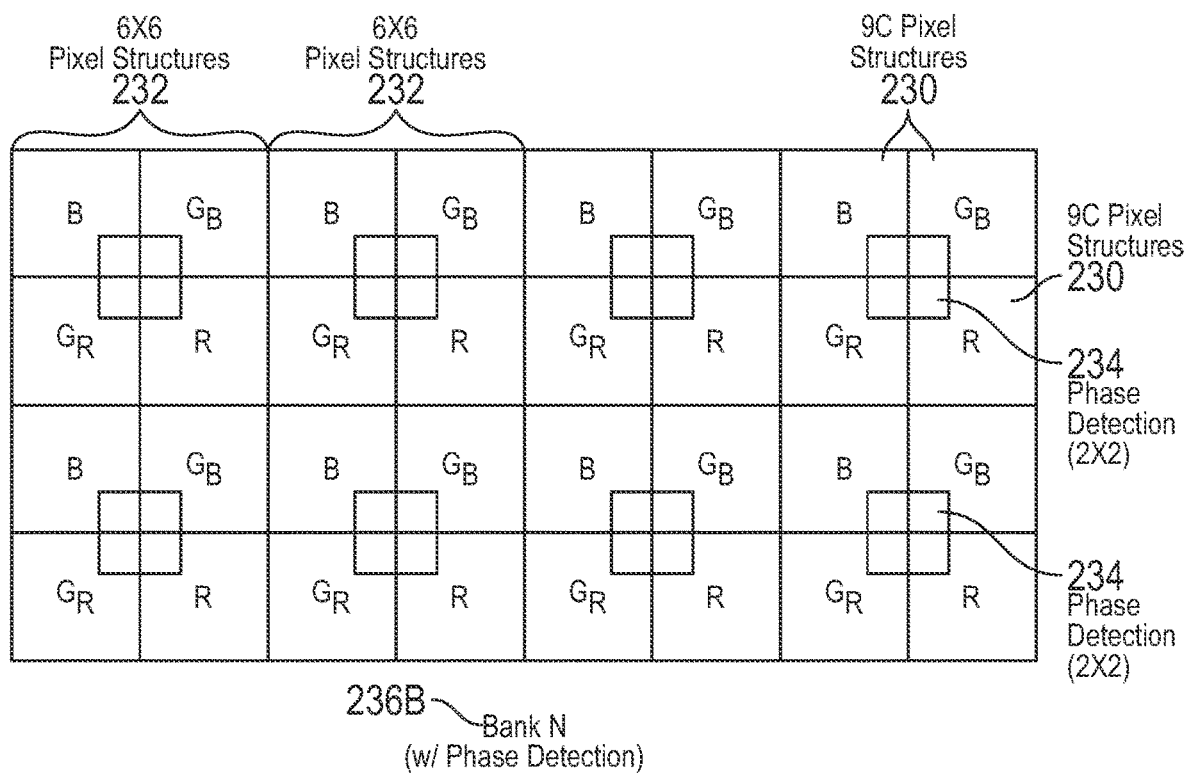
FIG. 2F illustrates one example of a bank of 9 cell 3×3 pixel structures that include phase detection autofocus photodiodes included in a center 2×2 grouping of photodiodes included in each 6×6 pixel structure in a pixel array in accordance with the teachings of the present disclosure.

FIG. 2F illustrates one example of a bank N 236B of 9 cell 3×3 pixel structures that include phase detection autofocus photodiodes included in a center 2×2 grouping of photodiodes included in each 6×6 pixel structure in a pixel array in accordance with the teachings of the present disclosure. In particular, FIG. 2F illustrates a bank N 236B of a pixel array that includes 9C pixel structures 230 arranged in the rows and columns of the pixel array. It is appreciated that bank N 236B of FIG. 2F shares many similarities with the bank N 236A of 9C pixel structures 230 discussed above in FIG. 2E. For instance, similar to bank N 236A of FIG. 2E, bank N 236B of FIG. 2F also includes 6×6 pixel structures 232 that are formed with 4 9C pixel structures 230, or 12 1×3 pixel circuits 204. In addition, each of the 9C pixel structures 230 is disposed under one of the color filters (e.g., B, $G_B$, $G_R$, R) of the color filter array that is disposed over the pixel array.

A difference between the bank N 236B of FIG. 2F and bank N 236A of FIG. 2E is that some of the photodiodes included in bank N 236B of FIG. 2F may be configured to provide phase detection information for the pixel array. For instance, as shown in the example depicted in FIG. 2F, a center 2×2 grouping of photodiodes 234 of each 6×6 pixel structure 232 is configurable to provide phase detection autofocus information. It is appreciated that in the depicted example, each of the center 2×2 grouping of photodiodes 234 of each 6×6 pixel structure 232 is disposed in a respective inside corner of each of the included 4 9C pixel structures 230. As such, in the examples described herein, the 4 photodiodes included in each center 2×2 grouping of photodiodes 234 are disposed under respective B, $G_B$, $G_R$, R color filters. In other examples, it is appreciated that the 4 photodiodes included in each center 2×2 grouping of photodiodes 234 may all be disposed under green color filters, or panchromatic filters, etc. In other words, in an example that includes photodiodes configured to provide phase detection information, the photodiodes that are configured to provide phase detection information are disposed under green color filters, or panchromatic color filters, etc., while the photodiodes that are configured to provide image data are disposed under red, green, or blue color filters.

Figure 3:
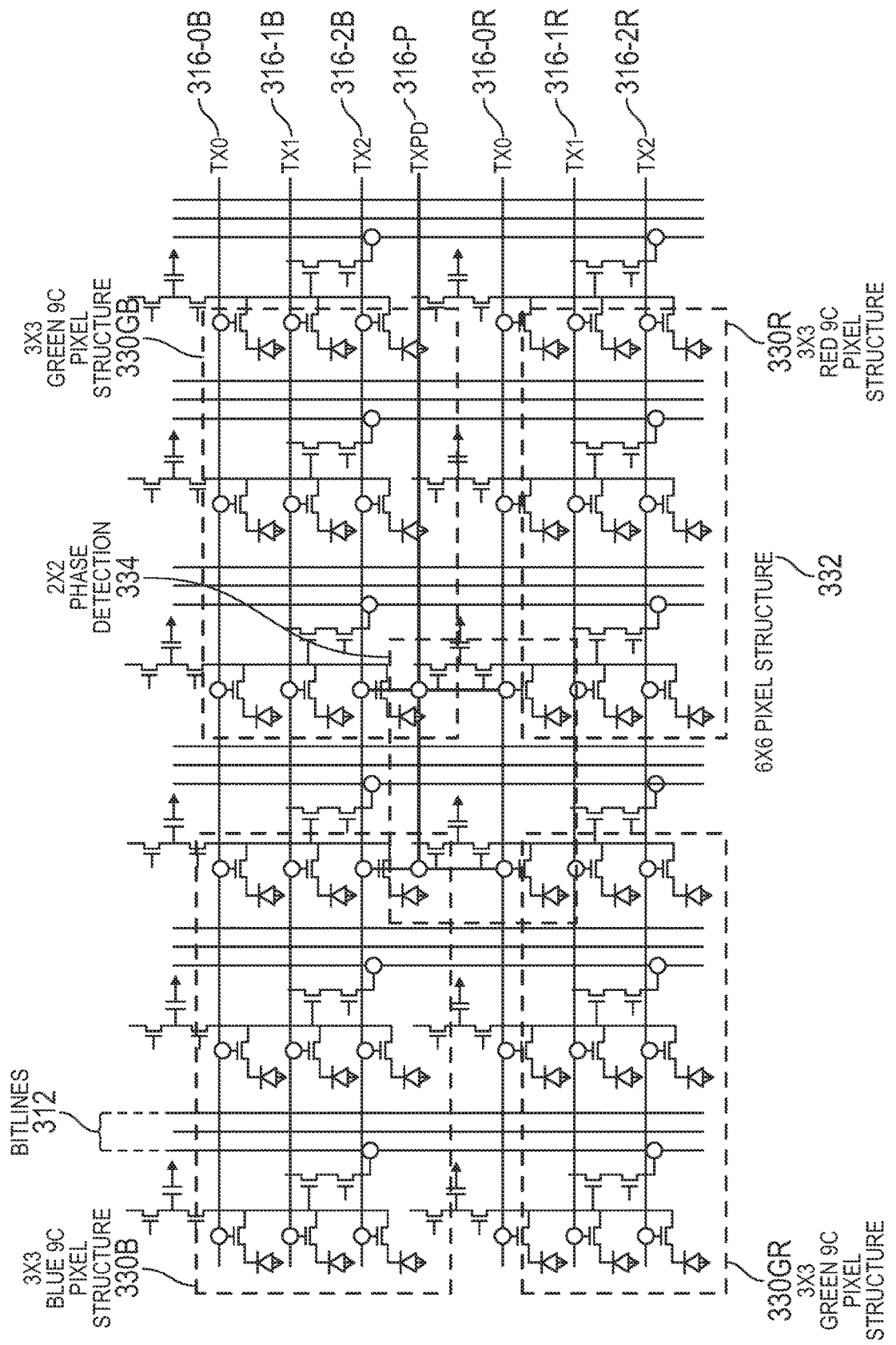
FIG. 3 illustrates a detailed schematic of one example of a 6×6 pixel structure including 4 9 cell 3×3 pixel structures that include a 2×2 arrangement of phase detection autofocus photodiodes included in a center 2×2 grouping of photodiodes included in each 6×6 pixel structure in a pixel array in accordance with the teachings of the present disclosure.

FIG. 3 illustrates a detailed schematic of one example of a 6×6 pixel structure 332 including 4 9 cell 3×3 pixel structures that include a 2×2 arrangement of phase detection autofocus photodiodes included in a center 2×2 grouping of photodiodes included in each 6×6 pixel structure 332 in a pixel array in accordance with the teachings of the present disclosure. It is appreciated that the 6×6 pixel structure 332 of FIG. 3 may be a detailed example of one of the 6×6 pixel structures 232 illustrated in FIGS. 2E-2F, and that similarly named and numbered elements described above are coupled and function similarly below.

In the example depicted in FIG. 3, 6×6 pixel structure 332 is illustrated as including a 3×3 blue 9C pixel structure 330B, a 3×3 green 9C pixel structure 330GB in the same row as the 3×3 blue 9C pixel structure 330G, a 3×3 red 9C pixel structure 330, and a 3×3 green 9C pixel structure 330GR in the same row as the 3×3 red 9C pixel structure 330. In the depicted example, a 2×2 phase detection 334 portion is located in the center 2×2 grouping of photodiodes to provide phase detection information for the pixel array. In the depicted example, the 4 photodiodes included in the center 2×2 grouping of photodiodes are illustrated as being disposed under respective B, $G_B$, $G_R$, R color filters. In other examples, it is appreciated that the 4 photodiodes included in each center 2×2 grouping of photodiodes 234 may all be disposed under green color filters, or panchromatic filters, etc. In other words, in an example that includes photodiodes configured to provide phase detection information, the photodiodes that are configured to provide phase detection information are disposed under green color filters, or panchromatic color filters, etc., while the photodiodes that are configured to provide image data are disposed under red, green, or blue color filters.

The depicted example also illustrates that each column of photodiodes included in each respective 1×3 pixel circuit (e.g., 1×3 pixel circuit 204) is coupled to one of 3 bitlines 312 per column of 1×3 pixel circuits. In the example depicted in FIG. 3, it is appreciated that all of the 1×3 pixel circutis are coupled to the first bitline (e.g., BL0 212-0). As such, it is appreciated that the example 6×6 pixel structure 332 depicted in FIG. 3 is included in bank 0. In comparison, if all of the 1×3 pixel circuits were coupled to the second bitline (e.g., BL1 212-1), then the example pixel 6×6 pixel structure would be included in bank 1. Similarly, if all of the 1×3 pixel circuits were coupled to the third bitline (e.g., BL2 212-2), then the example pixel 6×6 pixel structure would be included in bank 2.

The example depicted in FIG. 3 also illustrates that a first transfer control signal TX0 316-0B is coupled to control the first transfer control transistors in the row of 1×3 pixel circuits including the 3×3 blue 9C pixel structure 330B, a second transfer control signal TX1 316-1B is coupled to control the second transfer control transistors in the row of 1×3 pixel circuits including the 3×3 blue 9C pixel structure 330B, and a third transfer control signal TX2 316-2B is coupled to control the third transfer control transistors in the row of 1×3 pixel circuits including the 3×3 blue 9C pixel structure 330B. Similarly, a first transfer control signal TX0 316-0R is coupled to control the first transfer control transistors in the row of 1×3 pixel circuits including the 3×3 red 9C pixel structure 330R, a second transfer control signal TX1 316-1R is coupled to control the second transfer control transistors in the row of 1×3 pixel circuits including the 3×3 red 9C pixel structure 330R, and a third transfer control signal TX2 316-2R is coupled to control the third transfer control transistors in the row of 1×3 pixel circuits including the 3×3 red 9C pixel structure 330R. The example depicted in FIG. 3 further illustrates that a phase detection transfer control signal TXPD 316-P is coupled to control the transfer control transistors coupled to the center 2×2 grouping of photodiodes included in the 6×6 pixel structure 332.

Figure 4:
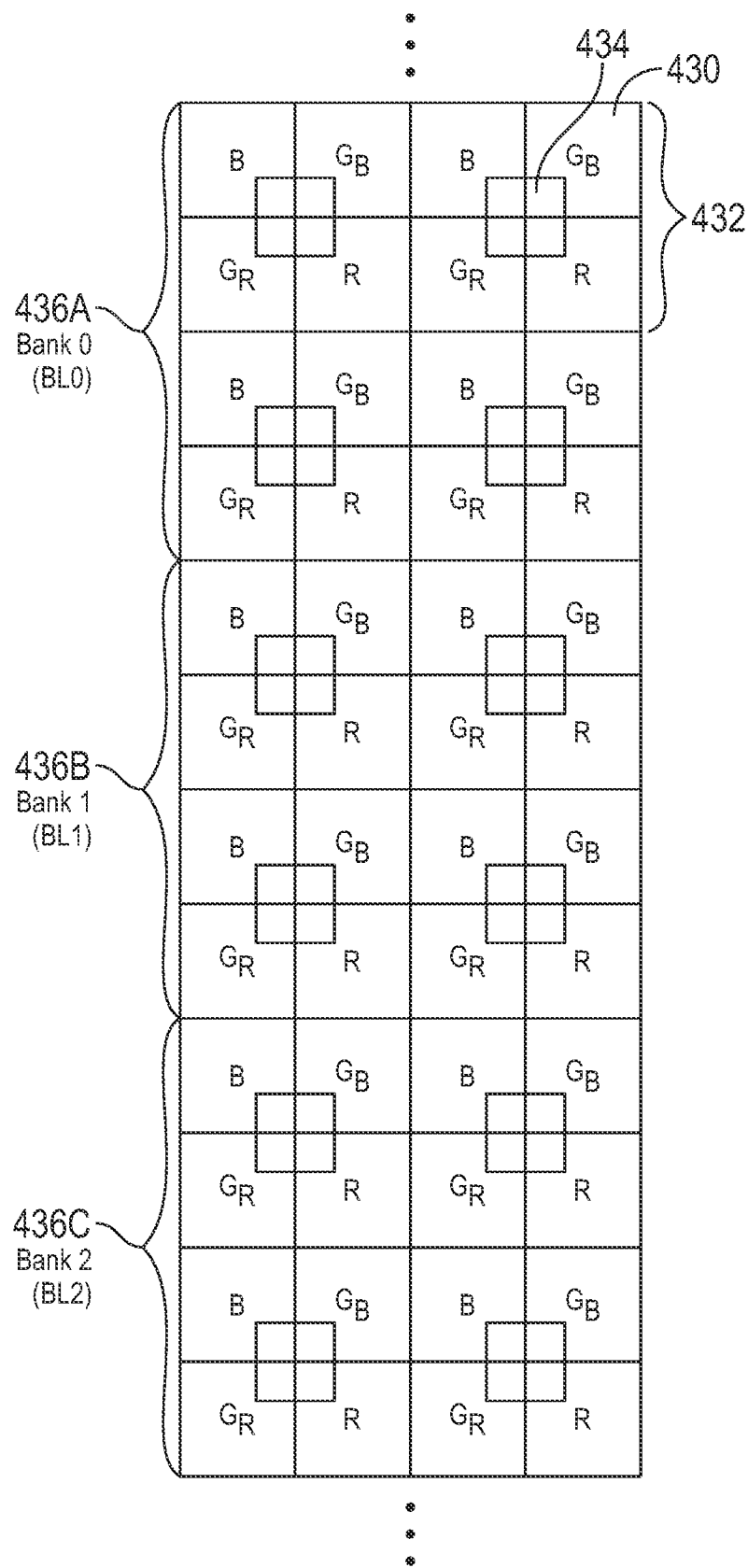
FIG. 4 illustrates one example of 6×6 pixel structures including 9 cell 3×3 pixel structures and 2×2 groupings of phase detection autofocus photodiodes that are arranged along the rows of a pixel array in a repeating sequence of first banks, second banks, and then third banks of pixel circuit in the pixel array in accordance with the teachings of the present disclosure.

FIG. 4 illustrates one example of banks 436A, 436B, 436C of 6×6 pixel structures 432 including 9 cell 3×3 pixel structures 430 and center 2×2 groupings of phase detection autofocus photodiodes 434 that are arranged along the rows of a pixel array in a repeating sequence of first banks, second banks, and then third banks of pixel circuits in the pixel array in accordance with the teachings of the present disclosure. In other words, the example depicted in FIG. 4 shows that bank 0 436A, bank 1 436B, and bank 2 436C are arranged along rows of the pixel array in a repeating sequence. It is appreciated that the banks 436A, 436B, 436C depicted in FIG. 4 may each be an example of the banks 236A, 236B shown in FIGS. 2E-2F, and that similarly named and numbered elements described above are coupled and function similarly below. As discussed above, each of the 1×3 pixel circuits included in bank 0 436A is coupled to the first bitline BL0 (e.g., BL0 212-0), each of the 1×3 pixel circuits included in bank 1 436B is coupled to the second bitline BL1 (e.g., BL1 212-1), and each of the 1×3 pixel circuits included in bank 2 436C is coupled to the third bitline BL2 (e.g., BL2 212-2).

Figure 5A:
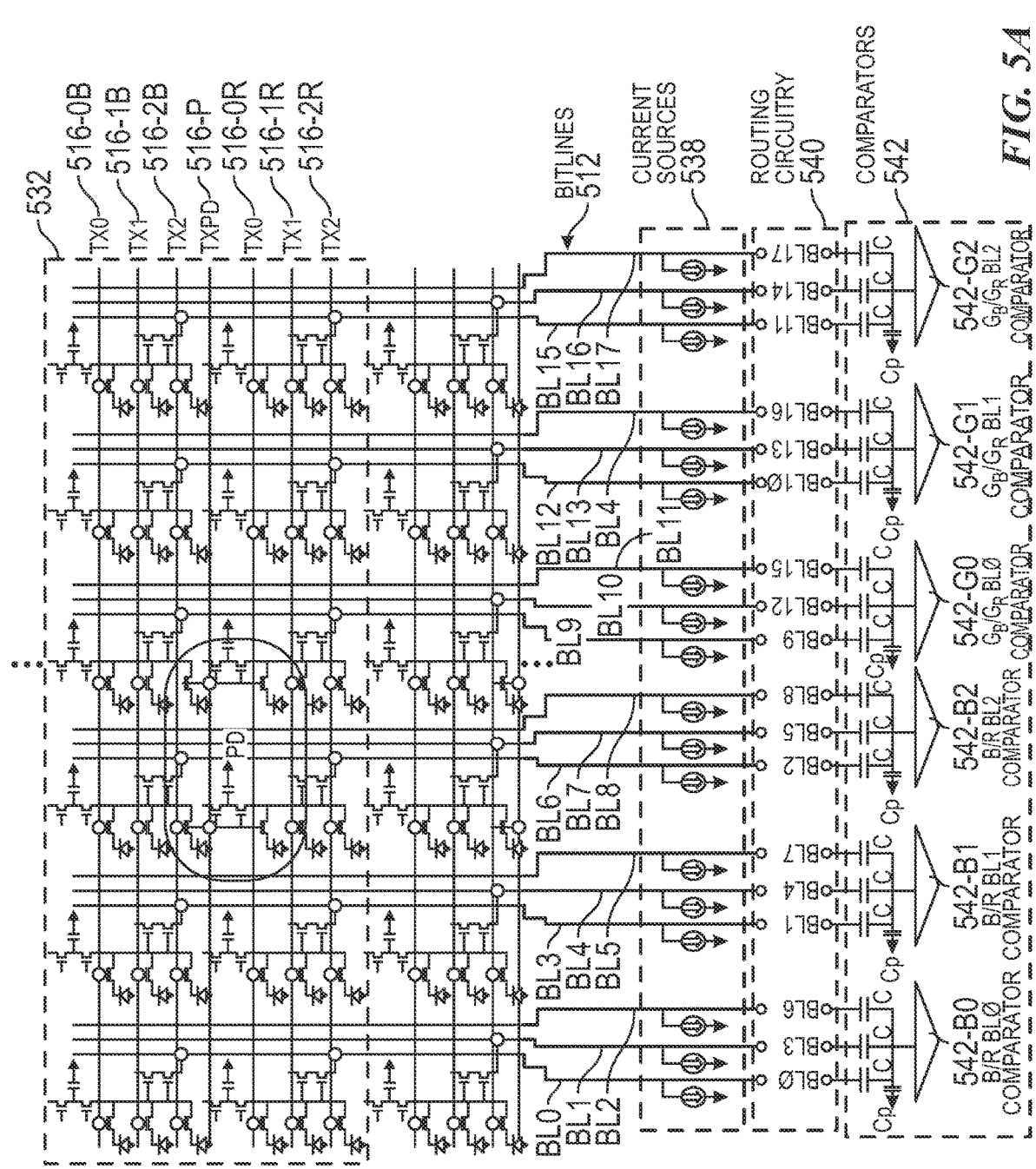
FIG. 5A illustrates a detailed schematic of one example of an imaging device including pixel circuits coupled to bitlines that are coupled to bitlines, current sources, routing circuitry, and comparators in the pixel array in accordance with the teachings of the present disclosure.

FIG. 5A illustrates a detailed schematic of one example of an imaging device including pixel circuits coupled to bitlines that are coupled to bitlines, current sources, routing circuitry, and comparators in the pixel array in accordance with the teachings of the present disclosure. It is appreciated that the pixel circuits and bitlines illustrated in FIG. 5A may be examples of the pixel circuits and bitlines discussed above in FIGS. 1-4, and that similarly named and numbered elements described above are coupled and function similarly below.

For instance, the example depicted in FIG. 5A illustrates pixel circuits including a 6×6 pixel structure 532, which shares many similarities with the 6×6 pixel structure 332 of FIG. 3. In the example depicted in FIG. 5A, 6×6 pixel structure 532 is illustrated as including a 3×3 9C pixel structure in the upper left corner, a 3×3 9C pixel structure in the upper right corner, a 3×3 9C pixel structure in the lower left corner, and a 3×3 9C pixel structure in the lower right corner of 6×6 pixel structure 532. In one example, the 3×3 9C pixel structures along the diagonal from the upper left to the lower right of 6×6 pixel structure 532 are blue and red 3×3 9C pixel structures. In the example, the 3×3 9C pixel structures along the other diagonal from the upper right to the lower left of 6×6 pixel structure 532 are green 3×3 9C pixel structures. In the depicted example, a 2×2 phase detection portion is located in the center 2×2 grouping of photodiodes to provide phase detection information for the pixel array.

In the example, each column of 1×3 pixel circuits in 6×6 pixel structure 532 includes 3 respective bitlines of the plurality of bitlines 512. For instance, bitlines BL0, BL1, BL2 are included in the first column of 1×3 pixel circuits, bitlines BL3, BL4, BL5 are included in the second column of 1×3 pixel circuits, bitlines BL6, BL7, BL8 are included in the third column of 1×3 pixel circuits, bitlines BL9, BL10, BL11 are included in the fourth column of 1×3 pixel circuits, bitlines BL12, BL13, BL14 are included in the fifth column of 1×3 pixel circuits, and bitlines BL15, BL16, BL17 are included in the sixth column of 1×3 pixel circuits of 6×6 pixel structure 532.

The specific example depicted in FIG. 5A illustrates that all of the 1×3 pixel circuits are coupled to the first (e.g., BL0, BL3, BL6, BL9, BL12, BL15) of the 3 bitlines of each column of 6×6 pixel structure 532. As such, it is appreciated that the example 6×6 pixel structure 532 depicted in FIG. 5A is included in bank 0. It further noted that the pixel cells below 6×6 pixel structure 532 are coupled to the second (e.g., BL1, BL4, BL7, BL10, BL13, BL16) of the 3 bitlines of each column of 6×6 pixel structure 532. As such, it is appreciated that the pixel cells below the example 6×6 pixel structure 532 depicted in FIG. 5A are included in bank 1.

The example depicted in FIG. 5A also illustrates that first, second, and third transfer control signals TX0 516-0B, TX1 516-1B, and TX2 516-2B are coupled to control the top 3 transfer transistors in the top rows of the 6×6 pixel structure 532. Similarly, first, second, and third transfer control signals TX0 516-0R, TX1 516-1R, and TX2 516-2R are coupled to control the bottom 3 transfer transistors of the bottom rows of the 6×6 pixel structure 532. The example depicted in FIG. 5A further illustrates that a phase detection transfer control signal TXPD 516-P is coupled to control the transfer control transistors coupled to the center 2×2 grouping of photodiodes included in the 6×6 pixel structure 532.

In one example, a readout circuit includes a plurality of current sources 538, routing circuitry 540, and a plurality of comparators 542 that are coupled to the plurality of bitlines 512 to readout image or phase detection autofocus signals from the pixel circuits of the pixel array. For instance, as shown in FIG. 5A, the plurality of current sources 538 are coupled to the plurality of bitlines 512 such that each of the bitlines BL0, BL1, BL2, BL3, BL4, BL5, BL6, BL7, BL8, BL9, BL10, BL11, BL12, BL13, BL14, BL15, BL16, BL17 of the plurality of bitlines 512 is coupled to a respective current source of the plurality of current sources 538.

In the example, the plurality of comparators 542 includes a first comparator 542-B0 that is configured to compare signals from blue or red pixel circuits that are coupled to the first bitline (e.g., BL0) of each 3 bitline grouping, a second comparator 542-B1 that is configured to compare signals from blue or red pixel circuits that are coupled to the second bitline (e.g., BL1) of each 3 bitline grouping, a third comparator 542-B2 that is configured to compare signals from blue or red pixel circuits that are coupled to the third bitline (e.g., BL2) of each 3 bitline grouping, a fourth comparator 542-G0 that is configured to compare signals from green pixel circuits that are coupled to the first bitline (e.g., BL0) of each 3 bitline grouping, a fifth comparator 542-G1 that is configured to compare signals from green pixel circuits that are coupled to the second bitline (e.g., BL1) of each 3 bitline grouping, and a sixth comparator 542-G2 that is configured to compare signals from green pixel circuits that are coupled to the third bitline (e.g., BL2) of each 3 bitline grouping.

Continuing with the depicted example, the routing circuitry 540 is coupled between the plurality of bitlines 512 and the plurality of comparators 542 to route each of the plurality of bitlines 512 to the proper one of the plurality of comparators 542. For instance, in a readout operation of a row of pixel circuits that includes blue and green pixel circuits, the routing circuitry 540 is configured to capacitively couple bitlines BL0, BL3, BL6 from bank 0 to first comparator 542-B0, bitlines BL1, BL4, BL7 from bank 1 to second comparator 542-B1, bitlines BL2, BL5, BL8 from bank 2 to second comparator 542-B1, bitlines BL9, BL12, BL15 from bank 0 to fourth comparator 542-G0, bitlines BL10, BL13, BL16 from bank 1 to fifth comparator 542-G1, and bitlines BL11, BL14, BL17 from bank 2 to sixth comparator 542-G2. As shown in the example, each bitline is capacitively coupled to the plurality of comparators 542 through a respective capacitance C and the parasitic capacitance is represented with a capacitance Cp coupled to the input of each of the plurality of comparators 542.

Figure 5B:
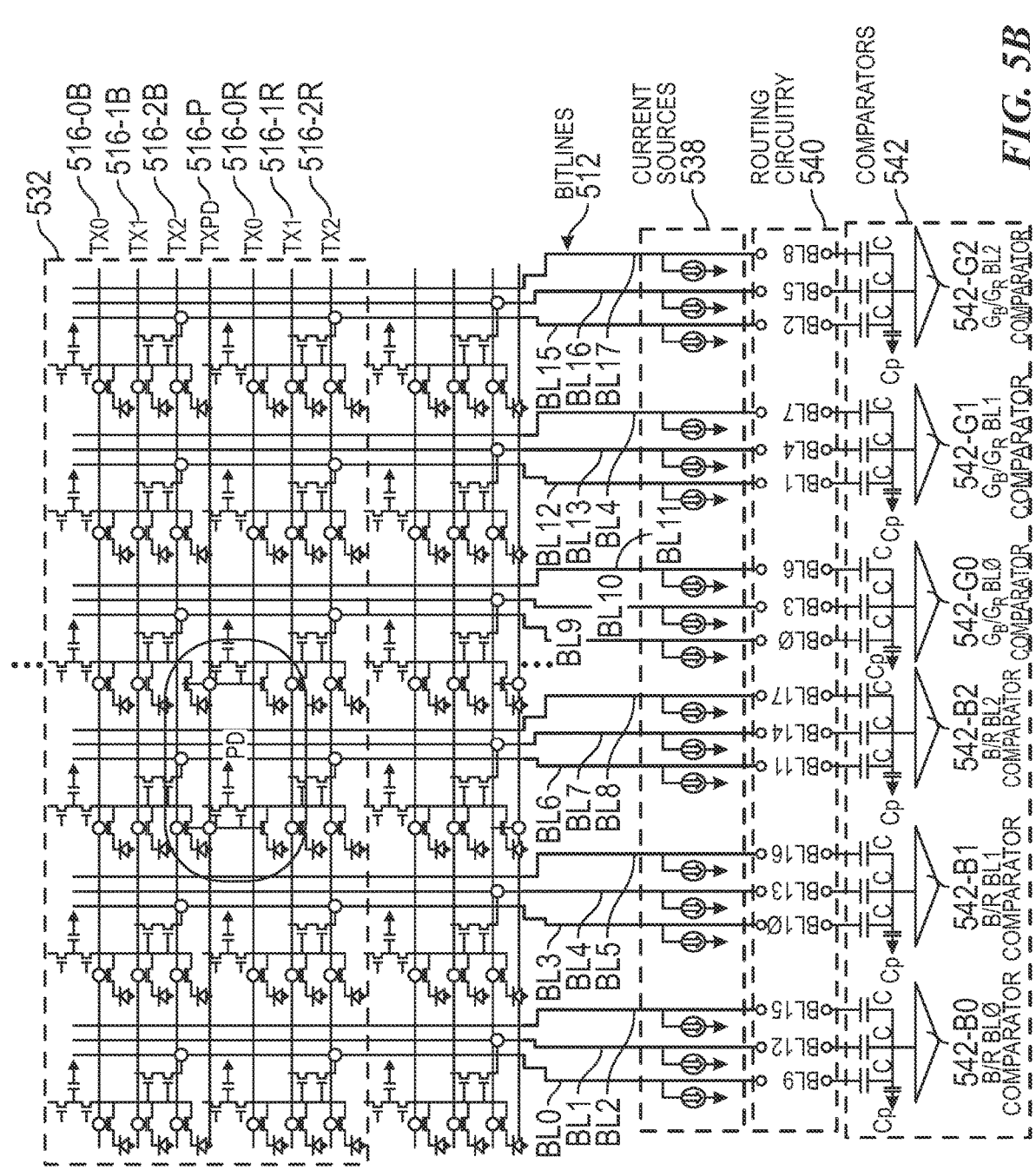
FIG. 5B illustrates a detailed schematic of another example of an imaging device including pixel circuits coupled to bitlines that are coupled to bitlines, current sources, routing circuitry, and comparators in the pixel array in accordance with the teachings of the present disclosure.

FIG. 5B illustrates a detailed schematic of another example of an imaging device including pixel circuits coupled to bitlines that are coupled to bitlines, current sources, routing circuitry, and comparators in the pixel array in accordance with the teachings of the present disclosure. It is appreciated that the pixel circuits and bitlines illustrated in FIG. 5B may be examples of the pixel circuits and bitlines discussed above in FIGS. 1-4, and that similarly named and numbered elements described above are coupled and function similarly below. It is further appreciated that the pixel circuits, bitlines, current sources, routing circuitry, and comparators illustrated in FIG. 5B are the same as the pixel circuits, bitlines, current sources, routing circuitry, and comparators illustrated in FIG. 5A except that the routing circuitry 540 depicted in FIG. 5B is configured to capacitively couple each of the plurality of bitlines 512 to the appropriate one of the plurality of comparators 540 during a readout operation of a row of pixel circuits that includes green and red pixel circuits instead of the example depicted in FIG. 5A in which a readout operation of a row of pixel circuits that includes blue and green pixel circuits is depicted. In operation, it is appreciated that when reading out a row of green and red pixel circuits instead of reading out a row of blue and green pixel circuits, the columns of the green pixel circuits or the columns of the blue and red pixel circuits are swapped. As such, the routing circuitry 540 is configured to swap inputs to each of the plurality of comparators 542 accordingly, depending on which colors are being read out from the pixel array.

For instance, as shown in the example depicted in FIG. 5B, in a readout operation of a row of pixel circuits that includes green and red pixel circuits, the routing circuitry 540 is configured to capacitively couple bitlines BL9, BL12, BL15 from bank 0 to first comparator 542-B0, bitlines BL10, BL13, BL16 from bank 1 to second comparator 542-B1, bitlines BL11, BL14, BL17 from bank 2 to third comparator 542-B2, bitlines BL0, BL3, BL6 from bank 0 to fourth comparator 542-G0, bitlines BL1, BL4, BL7 from bank 1 to fifth comparator 542-G1, and bitlines BL2, BL5, BL8 from bank 2 to sixth comparator 542-G2. As shown in the example, each bitline is capacitively coupled to the plurality of comparators 542 through a respective capacitance C and the parasitic capacitance is represented with a capacitance Cp coupled to the input of each of the plurality of comparators 542.

Figure 6:
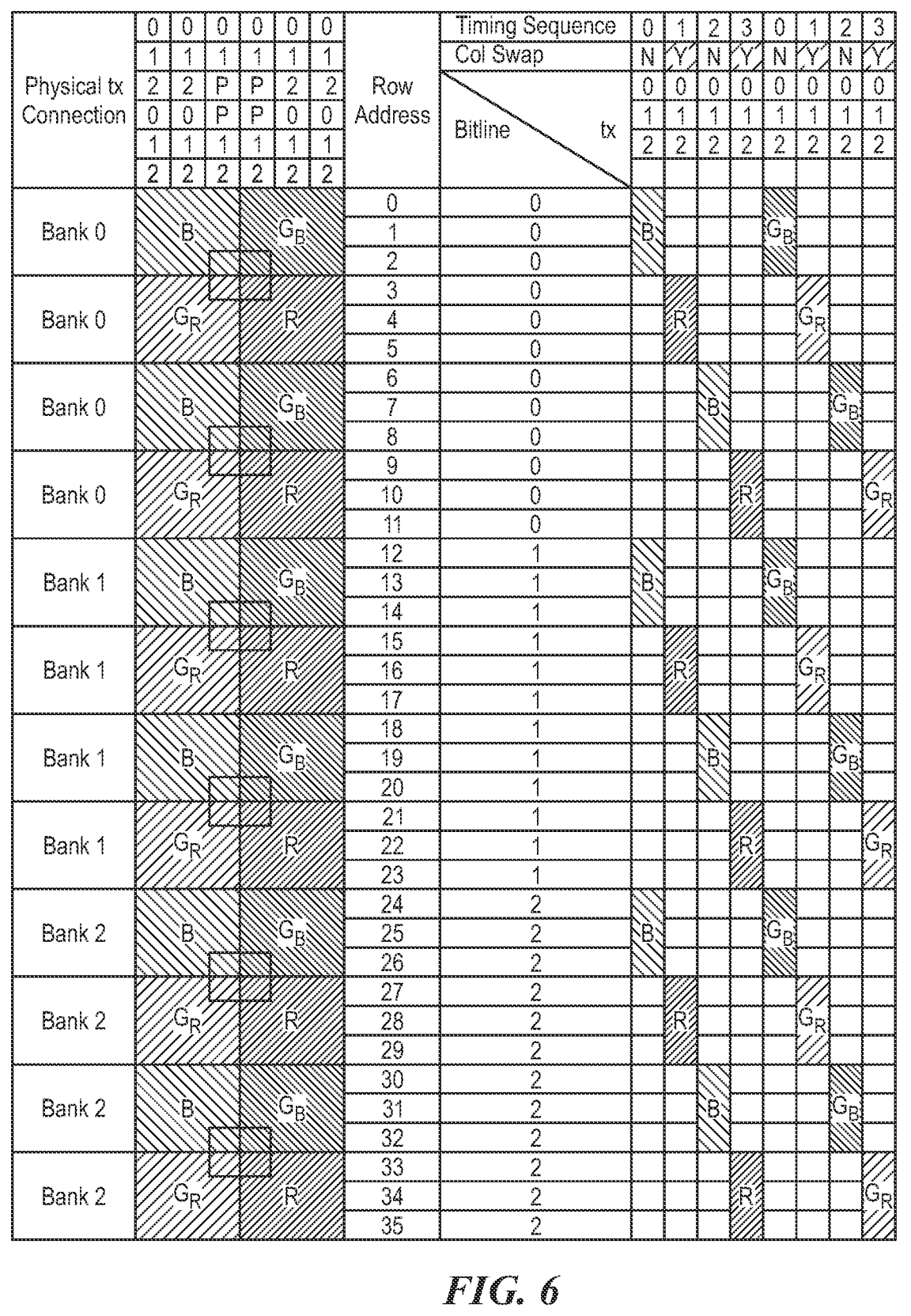

FIG. 6 illustrates a detailed diagram illustrating an example of a 9 cell binned readout of all of the banks of pixel circuits included in a pixel array without a readout of phase detection information in accordance with the teachings of the present disclosure. It is appreciated that the example 9 cell binned readout described in FIG. 6 may be a readout of the pixel array illustrated in FIGS. 5A-5B, and that similarly named and numbered elements described above are coupled and function similarly below.

As shown in the example depicted in FIG. 6, the 9 cell binned readout of the pixel array occurs in a timing sequence of 4 readouts, which are numbered 0, 1, 2, 3. During timing sequence 0, the blue (B) pixel circuits as well as the green ($G_B$) pixel circuits that are in the same row as the blue pixel circuits are readout from row addresses 0/1/2 of bank 0, from row addresses 12/13/14 of bank 1, and from row addresses 24/25/26 of bank 2. Accordingly, referring briefly back to the example depicted in FIG. 5A, the routing circuitry 540 is configured such that the comparators 542-B0, 542-B1, and 542-B2 are capacitively coupled to bitlines BL0/BL3/BL6, BL1/BL4/BL7, and BL2/BL5/BL8, respectively, to readout the blue pixel circuits, and the comparators 542-G0, 542-G1, and 542-G2 are capacitively coupled to bitlines BL9/BL12/BL15, BL10/BL13/BL16, and BL11/BL14/BL17, respectively, to readout the green pixel circuits that are in the same row as the blue pixel circuits.

Next, during timing sequence 1, the red (R) pixel circuits as well as the green ($G_R$) pixel circuits that are in the same row as the red pixel circuits are readout from row addresses 3/4/5 of bank 0, from row addresses 15/16/17 of bank 1, and from row addresses 27/28/29 of bank 2. Accordingly, referring briefly back to the example depicted in FIG. 5B, the routing circuitry 540 is configured to "swap" the bitlines such that the comparators 542-B0, 542-B1, and 542-B2 are capacitively coupled to bitlines BL9/BL12/BL15, BL10/BL13/BL16, and BL11/BL14/BL17, BL0/BL3/BL6, BL1/BL4/BL7, and BL2/BL5/BL8, respectively, to readout the red pixel circuits, and the comparators 542-G0, 542-G1, and 542-G2 are capacitively coupled to bitlines BL0/BL3/BL6, BL1/BL4/BL7, and BL2/BL5/BL8, respectively, to readout the green pixel circuits that are in the same row as the red pixel circuits. It is noted that when reading out the blue and green pixels during timing sequence 0, the routing circuitry 540 is not configured to "swap" the bitlines as is done during timing sequence 1.

Next, during timing sequence 2, the blue (B) pixel circuits as well as the green ($G_B$) pixel circuits that are in the same row as the blue pixel circuits are readout from row addresses 6/7/8 of bank 0, from row addresses 18/19/20 of bank 1, and from row addresses 30/31/32 of bank 2. Accordingly, referring briefly back to the example depicted in FIG. 5A, the routing circuitry 540 is configured not to "swap" the bitlines such that the comparators 542-B0, 542-B1, and 542-B2 are capacitively coupled to bitlines BL0/BL3/BL6, BL1/BL4/BL7, and BL2/BL5/BL8, respectively, to readout the blue pixel circuits, and the comparators 542-G0, 542-G1, and 542-G2 are capacitively coupled to bitlines BL9/BL12/BL15, BL10/BL13/BL16, and BL11/BL14/BL17, respectively, to readout the green pixel circuits that are in the same row as the blue pixel circuits.

Next, during timing sequence 3, the red (R) pixel circuits as well as the green ($G_R$) pixel circuits that are in the same row as the red pixel circuits are readout from row addresses 9/10/11 of bank 0, from row addresses 15/16/17 of bank 1, and from row addresses 33/34/35 of bank 2. Accordingly, referring briefly back to the example depicted in FIG. 5B, the routing circuitry 540 is configured to "swap" the bitlines such that the comparators 542-B0, 542-B1, and 542-B2 are capacitively coupled to bitlines BL9/BL12/BL15, BL10/BL13/BL16, and BL11/BL14/BL17, BL0/BL3/BL6, BL1/BL4/BL7, and BL2/BL5/BL8, respectively, to readout the red pixel circuits, and the comparators 542-G0, 542-G1, and 542-G2 are capacitively coupled to bitlines BL0/BL3/BL6, BL1/BL4/BL7, and BL2/BL5/BL8, respectively, to readout the green pixel circuits that are in the same row as the red pixel circuits.

As can be appreciated from the 9C binned readout example described above, all 3 bitlines of each 3 bitline grouping (e.g., BL0, BL1, BL2) of each column of 1×3 pixel circuits are occupied or utilized at the same time as all 3 banks (e.g., bank 0, bank 1, bank 2) are readout simultaneously.

Figure 7:
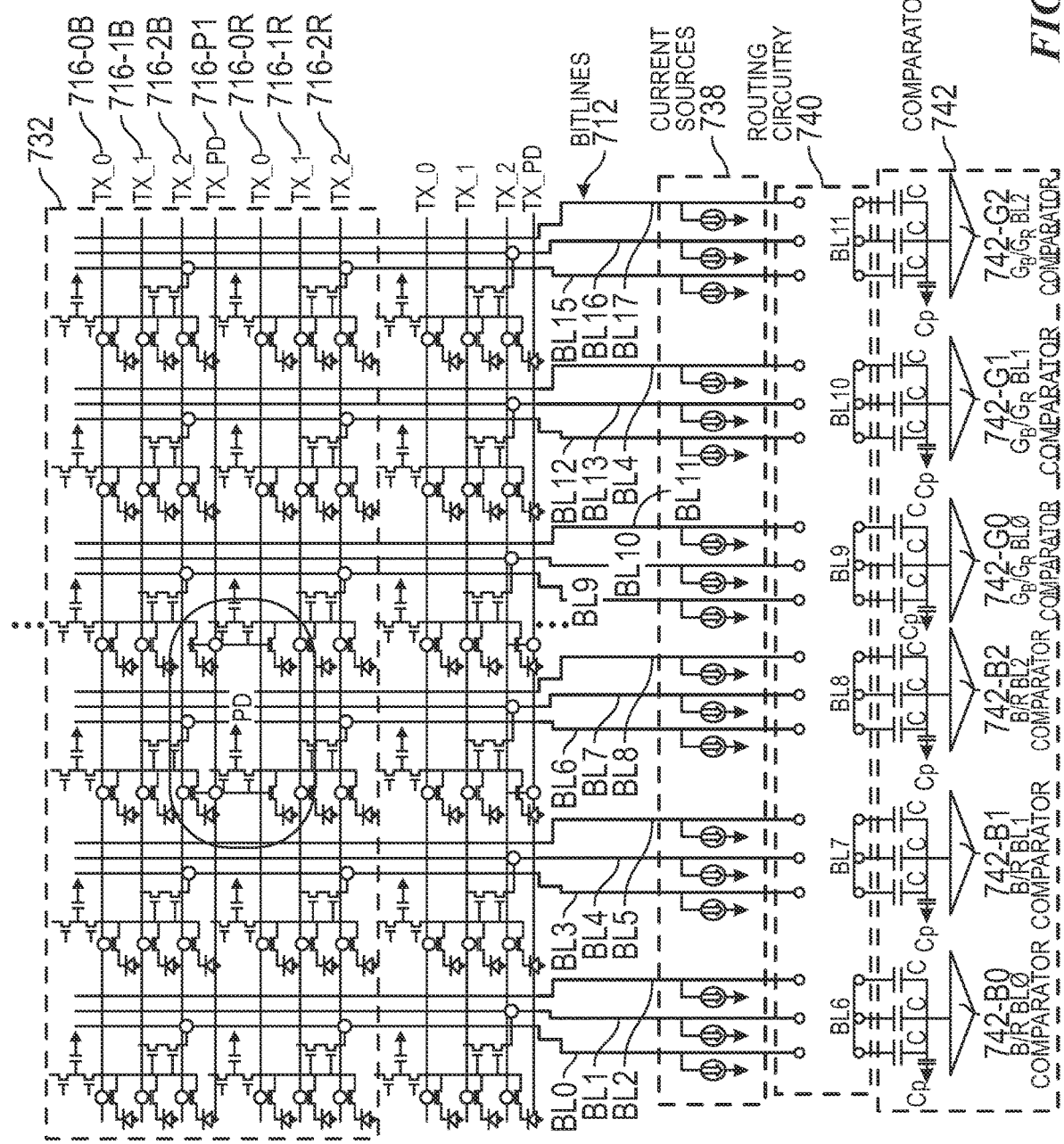
FIG. 7 illustrates a detailed schematic of yet another example of an imaging device including pixel circuits coupled to bitlines that are coupled to bitlines, current sources, routing circuitry, and comparators in the pixel array in accordance with the teachings of the present disclosure.

FIG. 7 illustrates a detailed schematic of yet another example of an imaging device including pixel circuits coupled to bitlines that are coupled to bitlines, current sources, routing circuitry, and comparators in the pixel array in accordance with the teachings of the present disclosure. It is appreciated that the pixel circuits and bitlines illustrated in FIG. 7 may be examples of the pixel circuits and bitlines discussed above in FIGS. 1-4, and that similarly named and numbered elements described above are coupled and function similarly below. It is further appreciated that the pixel circuits, bitlines, current sources, routing circuitry, and comparators illustrated in FIG. 7 are the same as the pixel circuits, bitlines, current sources, routing circuitry, and comparators illustrated in FIGS. 5A-5B except that the routing circuitry 740 depicted in FIG. 7 is configured to capacitively couple the bitlines BL6/BL7/BL8 and BL9/B10/BL11 of the plurality of bitlines 712 to the appropriate one of the plurality of comparators 740 during a readout operation of phase detection autofocus information from the photodiodes of the center 2×2 grouping of photodiodes of the illustrated 6×6 pixel structure 732 of the pixel array.

In operation, it is appreciated that when reading out the phase detection autofocus information from the photodiodes of the center 2×2 grouping of photodiodes of the illustrated 6×6 pixel structure 732, the routing circuitry 740 is configured to couple the bitlines to the inputs to each of the plurality of comparators 742 accordingly. For instance, as shown in the example depicted in FIG. 7, the phase detection autofocus photodiodes included among the blue 3×3 9C pixel structures of bank 0 as well as the green 3×3 9C pixel structures that are in the same row as the red 3×3 9C pixel structures of bank 0 are coupled to bitline BL6. Similarly, the phase detection autofocus photodiodes included among the blue 3×3 9C pixel structures of bank 1 as well as the green 3×3 9C pixel structures that are in the same row as the red 3×3 9C pixel structures of bank 1 are coupled to bitline BL7. Similarly, the phase detection autofocus photodiodes included among the blue 3×3 9C pixel structures of bank 2 as well as the green 3×3 9C pixel structures that are in the same row as the red 3×3 9C pixel structures of bank 2 are coupled to bitline BL8.

Similarly, the phase detection autofocus photodiodes included among the red 3×3 9C pixel structures of bank 0 as well as the green 3×3 9C pixel structures that are in the same row as the blue 3×3 9C pixel structures of bank 0 are coupled to bitline BL9. Similarly, the phase detection autofocus photodiodes included among the red 3×3 9C pixel structures of bank 1 as well as the green 3×3 9C pixel structures that are in the same row as the blue 3×3 9C pixel structures of bank 1 are coupled to bitline BL10. Similarly, the phase detection autofocus photodiodes included among the red 3×3 9C pixel structures of bank 2 as well as the green 3×3 9C pixel structures that are in the same row as the blue 3×3 9C pixel structures of bank 2 are coupled to bitline BL11.

Therefore, it is appreciated that when reading out the phase detection autofocus information from the photodiodes of the center 2×2 grouping of photodiodes of the illustrated 6×6 pixel structure 732, as described above, the routing circuitry 740 is configured to capacitively couple bitlines BL6, BL7, BL8, BL9, BL10, and BL11 to the inputs of first comparator 742-B0, second comparator 742-B1, third comparator 742-B2, fourth comparator 742-G0, fifth comparator 742-G1, and sixth comparator 742-G2, respectively. As shown in the example, each bitline is capacitively coupled to the plurality of comparators 742 through respective capacitances C and the parasitic capacitance is represented with a capacitance Cp coupled to the input of each of the plurality of comparators 742.

Figure 8:
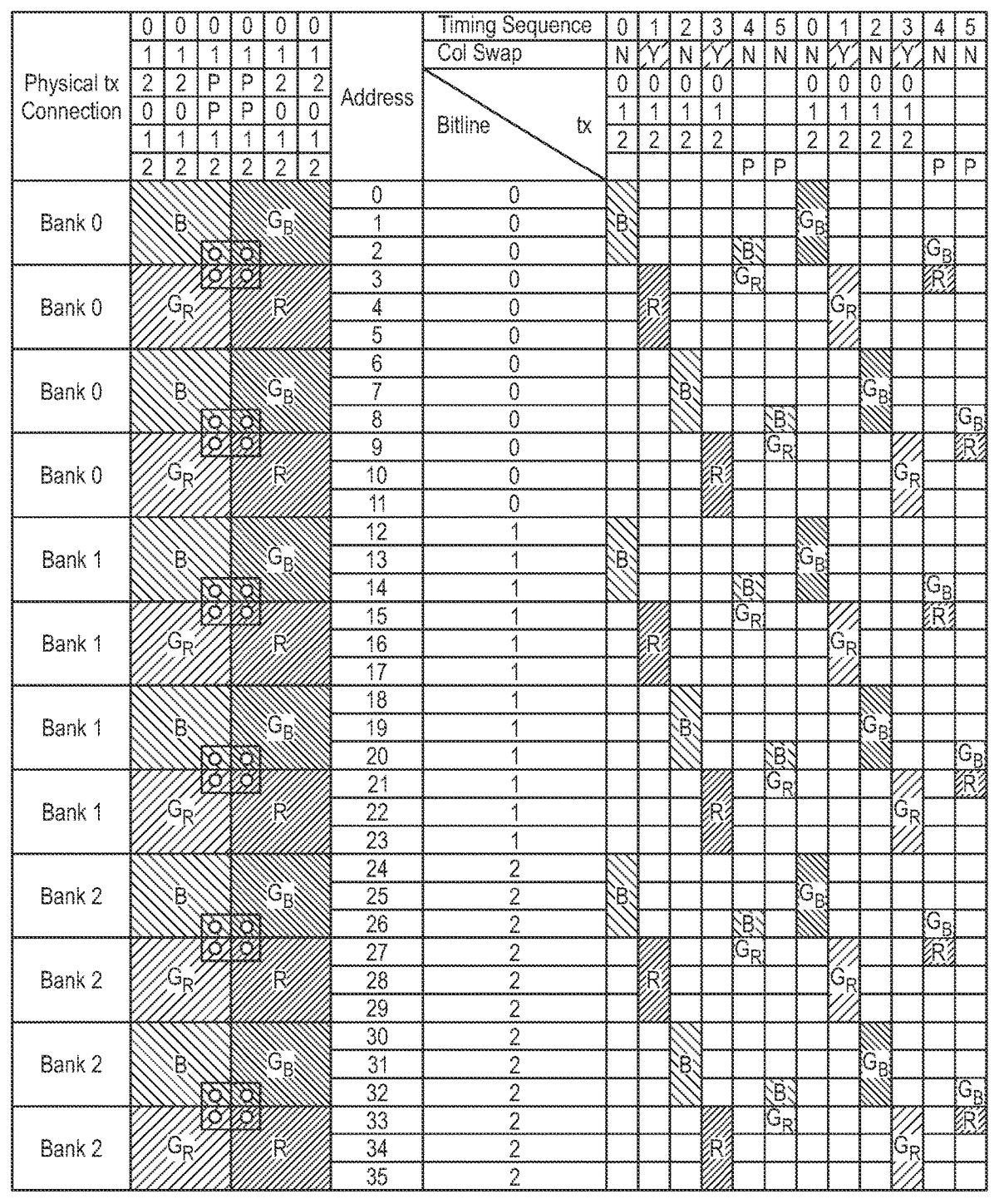

FIG. 8 illustrates a detailed diagram illustrating another example of a 9 cell binned readout of all of the banks of pixel circuits included in a pixel array with a readout of phase detection information in accordance with the teachings of the present disclosure. It is appreciated that the example 9 cell binned readout with a readout of phase detection information described in FIG. 8 may be a readout of the pixel array illustrated in FIGS. 5A-5B and FIG. 7, and that similarly named and numbered elements described above are coupled and function similarly below.

As shown in the example depicted in FIG. 8, the 9 cell binned readout with a readout of phase detection information of the pixel array occurs in a timing sequence of 6 readouts, which are numbered 0, 1, 2, 3, 4, 5. During timing sequence 0, the blue (B) pixel circuits as well as the green ($G_B$) pixel circuits that are in the same row as the blue pixel circuits are readout from row addresses 0/1/2 of bank 0, from row addresses 12/13/14 of bank 1, and from row addresses 24/25/26 of bank 2. Accordingly, referring briefly back to the example depicted in FIG. 5A, the routing circuitry 540 is configured such that the comparators 542-B0, 542-B1, and 542-B2 are capacitively coupled to bitlines BL0/BL3/BL6, BL1/BL4/BL7, and BL2/BL5/BL8, respectively, to readout the blue pixel circuits, and the comparators 542-G0, 542-G1, and 542-G2 are capacitively coupled to bitlines BL9/BL12/BL15, BL10/BL13/BL16, and BL11/BL14/BL17, respectively, to readout the green pixel circuits that are in the same row as the blue pixel circuits.

Next, during timing sequence 1, the red (R) pixel circuits as well as the green ($G_R$) pixel circuits that are in the same row as the red pixel circuits are readout from row addresses 3/4/5 of bank 0, from row addresses 15/16/17 of bank 1, and from row addresses 27/28/29 of bank 2. Accordingly, referring briefly back to the example depicted in FIG. 5B, the routing circuitry 540 is configured to "swap" the bitlines such that the comparators 542-B0, 542-B 1, and 542-B2 are capacitively coupled to bitlines BL9/BL12/BL15, BL10/BL13/BL16, and BL11/BL14/BL17, BL0/BL3/BL6, BL1/BL4/BL7, and BL2/BL5/BL8, respectively, to readout the red pixel circuits, and the comparators 542-G0, 542-G1, and 542-G2 are capacitively coupled to bitlines BL0/BL3/BL6, BL1/BL4/BL7, and BL2/BL5/BL8, respectively, to readout the green pixel circuits that are in the same row as the red pixel circuits. It is noted that when reading out the blue and green pixels during timing sequence 0, the routing circuitry 540 is not configured to "swap" the bitlines as is done during timing sequence 1.

Next, during timing sequence 2, the blue (B) pixel circuits as well as the green ($G_B$) pixel circuits that are in the same row as the blue pixel circuits are readout from row addresses 6/7/8 of bank 0, from row addresses 18/19/20 of bank 1, and from row addresses 30/31/32 of bank 2. Accordingly, referring briefly back to the example depicted in FIG. 5A, the routing circuitry 540 is configured not to "swap" the bitlines such that the comparators 542-B0, 542-B1, and 542-B2 are capacitively coupled to bitlines BL0/BL3/BL6, BL1/BL4/BL7, and BL2/BL5/BL8, respectively, to readout the blue pixel circuits, and the comparators 542-G0, 542-G1, and 542-G2 are capacitively coupled to bitlines BL9/BL12/BL15, BL10/BL13/BL16, and BL11/BL14/BL17, respectively, to readout the green pixel circuits that are in the same row as the blue pixel circuits.

Next, during timing sequence 3, the red (R) pixel circuits as well as the green ($G_R$) pixel circuits that are in the same row as the red pixel circuits are readout from row addresses 9/10/11 of bank 0, from row addresses 15/16/17 of bank 1, and from row addresses 33/34/35 of bank 2. Accordingly, referring briefly back to the example depicted in FIG. 5B, the routing circuitry 540 is configured to "swap" the bitlines such that the comparators 542-B0, 542-B1, and 542-B2 are capacitively coupled to bitlines BL9/BL12/BL15, BL10/BL13/BL16, and BL11/BL14/BL17, BL0/BL3/BL6, BL1/BL4/BL7, and BL2/BL5/BL8, respectively, to readout the red pixel circuits, and the comparators 542-G0, 542-G1, and 542-G2 are capacitively coupled to bitlines BL0/BL3/BL6, BL1/BL4/BL7, and BL2/BL5/BL8, respectively, to readout the green pixel circuits that are in the same row as the red pixel circuits.

Next, during timing sequence 4, the phase detection autofocus photodiode included among the blue (B) pixel circuits, the phase detection autofocus photodiode included among the green ($G_R$) pixel circuits that are in the same row as the red pixel circuits, the phase detection autofocus photodiode included among the green ($G_B$) pixel circuits that are in the same row as the blue pixel circuits, and the phase detection autofocus photodiode included among the red (R) pixel circuits are readout from row addresses 2/3 of bank 0, from row addresses 14/15 of bank 1, and from row addresses 26/27 of bank 2. Accordingly, referring briefly back to the example depicted in FIG. 7, the routing circuitry 740 is configured to route the bitlines such that the inputs comparator 742-B0 are capacitively coupled to bitline BL6, the inputs comparator 742-B1 are capacitively coupled to bitline BL7, the inputs comparator 742-B2 are capacitively coupled to bitline BL8, the inputs comparator 742-G0 are capacitively coupled to bitline BL9, the inputs comparator 742-G1 are capacitively coupled to bitline BL10, and the inputs comparator 742-G2 are capacitively coupled to bitline BL11.

Next, during timing sequence 5, the phase detection autofocus photodiode included among the blue (B) pixel circuits, the phase detection autofocus photodiode included among the green ($G_R$) pixel circuits that are in the same row as the red pixel circuits, the phase detection autofocus photodiode included among the green ($G_B$) pixel circuits that are in the same row as the blue pixel circuits, and the phase detection autofocus photodiode included among the red (R) pixel circuits are readout from row addresses 8/9 of bank 0, from row addresses 20/21 of bank 1, and from row addresses 32/33 of bank 2. Accordingly, referring briefly back to the example depicted in FIG. 7, the routing circuitry 740 is again configured to route the bitlines such that the inputs comparator 742-B0 are capacitively coupled to bitline BL6, the inputs comparator 742-B1 are capacitively coupled to bitline BL7, the inputs comparator 742-B2 are capacitively coupled to bitline BL8, the inputs comparator 742-G0 are capacitively coupled to bitline BL9, the inputs comparator 742-G1 are capacitively coupled to bitline BL10, and the inputs comparator 742-G2 are capacitively coupled to bitline BL11.

Figure 9:
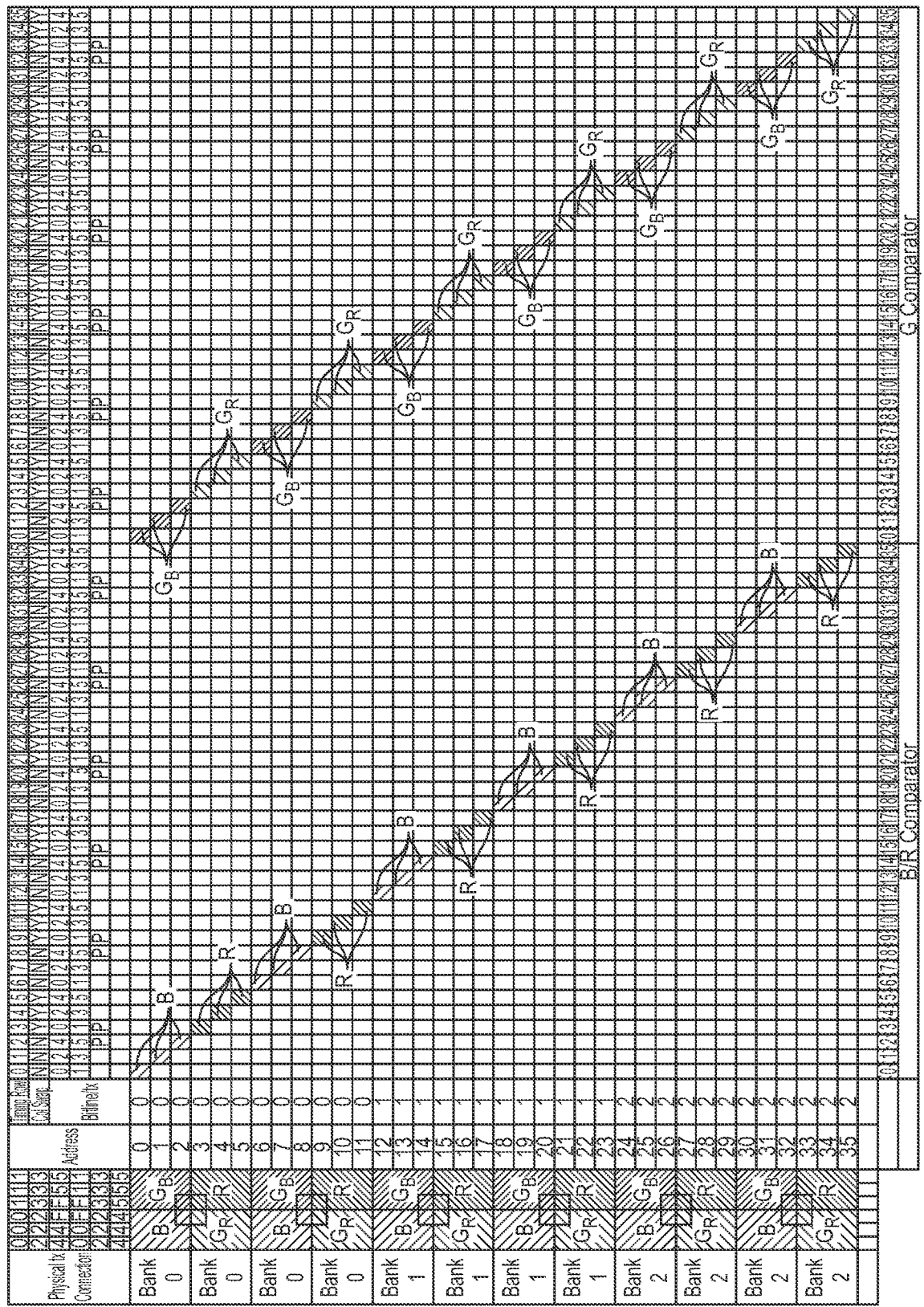
FIG. 9 illustrates a detailed diagram illustrating an example of a full resolution readout of all of the banks of pixel circuits included in a pixel array without a readout of phase detection information in accordance with the teachings of the present disclosure.

FIG. 9 illustrates a detailed diagram illustrating an example of a full resolution readout of all of the banks of pixel circuits included in a pixel array without a readout of phase detection information in accordance with the teachings of the present disclosure. It is appreciated that the example full resolution readout of all of the banks of pixel circuits included in a pixel array described in FIG. 9 may be a readout of the pixel array illustrated in FIGS. 5A-5B, and that similarly named and numbered elements described above are coupled and function similarly below.

As shown in the example depicted in FIG. 9, the example full resolution readout of all of the banks of pixel circuits included in a pixel array occurs in a timing sequence of 36 readouts, which are numbered 0-35. In one example, during a full resolution readout, only 1 of the transfer transistors is turned on at a time (e.g., TX0, TX1, TX2) in each 1×3 pixel circuit that is being readout, and only 1 of the grouping of 3 bitlines per column of 1×3 pixel circuits is active, and the remaining 2 bitlines of the grouping of 3 bitlines per column of 1×3 pixel circuits are idle or not used. In comparison, it is noted that in the 9C binned readout example described above, all 3 bitlines of each 3 bitline grouping (e.g., BL0, BL1, BL2) of each column of 1×3 pixel circuits are occupied or utilized at the same time as all 3 banks (e.g., bank 0, bank 1, bank 2) are readout simultaneously.

During timing sequences 0-11, the photodiodes included in bank 0, which include rows 0-11, are readout. As shown, during timing sequences 0-2 and 6-8, the blue (B) photodiodes and the green ($G_B$) photodiodes that are included in the same row as the blue photodiodes are readout from bank 0. During timing sequences 0-2 and 6-8, the routing circuitry 540 does not "swap" the bitlines when reading out the blue (B) photodiodes and the green ($G_B$) photodiodes that are included in the same row as the blue photodiodes, as illustrated for example in FIG. 5A.

During timing sequences 3-5 and 9-11, the red (R) photodiodes and the green ($G_R$) photodiodes that are included in the same row as the red photodiodes are readout from bank 0. During timing sequences 3-5 and 9-11, the routing circuitry 540 "swaps" the bitlines when reading out the red (R) photodiodes and the green ($G_R$) photodiodes that are included in the same row as the red photodiodes, as illustrated for example in FIG. 5B.

During timing sequences 12-23, the photodiodes included in bank 1, which include rows 12-23, are readout. As shown, during timing sequences 12-14 and 18-20, the blue (B) photodiodes and the green ($G_B$) photodiodes that are included in the same row as the blue photodiodes are readout from bank 1. During timing sequences 12-14 and 18-20, the routing circuitry 540 does not "swap" the bitlines when reading out the blue (B) photodiodes and the green ($G_B$) photodiodes that are included in the same row as the blue photodiodes, as illustrated for example in FIG. 5A.

During timing sequences 15-17 and 21-23, the red (R) photodiodes and the green ($G_R$) photodiodes that are included in the same row as the red photodiodes are readout from bank 1. During timing sequences 15-17 and 21-23, the routing circuitry 540 "swaps" the bitlines when reading out the red (R) photodiodes and the green ($G_R$) photodiodes that are included in the same row as the red photodiodes, as illustrated for example in FIG. 5B.

During timing sequences 24-35, the photodiodes included in bank 2, which include rows 24-35, are readout. As shown, during timing sequences 24-26 and 30-32, the blue (B) photodiodes and the green ($G_B$) photodiodes that are included in the same row as the blue photodiodes are readout from bank 2. During timing sequences 24-26 and 30-32, the routing circuitry 540 does not "swap" the bitlines when reading out the blue (B) photodiodes and the green ($G_B$) photodiodes that are included in the same row as the blue photodiodes, as illustrated for example in FIG. 5A.

During timing sequences 27-29 and 33-35, the red (R) photodiodes and the green ($G_R$) photodiodes that are included in the same row as the red photodiodes are readout from bank 2. During timing sequences 27-29 and 33-35, the routing circuitry 540 "swaps" the bitlines when reading out the red (R) photodiodes and the green ($G_R$) photodiodes that are included in the same row as the red photodiodes, as illustrated for example in FIG. 5B.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
   a pixel array including:
      a plurality of 1×3 pixel circuits arranged in rows and columns of the pixel array, wherein each 1×3 pixel circuit includes 3 photodiodes included in a respective column of 1×3 pixel circuits in the pixel array, wherein the 3 photodiodes of each 1×3 pixel circuit included in the respective column of 1×3 pixel circuits in the pixel array are included in a respective 3 rows of the pixel array;
      a plurality of bitlines coupled to the plurality of 1×3 pixel circuits, wherein the plurality of bitlines is divided into groupings of 3 bitlines per column of the 1×3 pixel circuits in the pixel array, wherein each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines; and
      a plurality of 9-cell (9C) pixel structures, wherein the plurality of 1×3 pixel circuits is further arranged into groupings of 3 1×3 pixel circuits per 9C pixel structure to form a plurality of 3×3 pixel structures of the pixel array.

2. The imaging device of claim 1, wherein the plurality of 1×3 circuits are arranged along rows of the pixel array in a repeating sequence of one of the first banks of the 1×3 pixel circuits, one of the second banks of the 1×3 pixel circuits, and one of the third banks of the 1×3 pixel circuits.

3. The imaging device of claim 2, wherein each column of the 1×3 pixel circuits in the plurality of first banks of the 1×3 pixel circuits, the plurality of second banks of the 1×3 pixel circuits, and the plurality of third banks of the 1×3 pixel circuits includes 4 1×3 pixel circuits.

4. The imaging device of claim 3, further comprising a color filter array disposed over photodiodes of the pixel array configured to sense image data, wherein the color filter array comprises:
- a plurality of color filters having a first color;
- a plurality of color filters having a second color; and
- a plurality of color filters having a third color, wherein photodiodes of each one of the plurality of 9C pixel structures configured to sense image data are covered by one of the plurality of color filters having the first color, the plurality of color filters having the second color, or the plurality of color filters having the third color.

5. The imaging device of claim 4, wherein the plurality of 9C pixel structures is arranged into groupings of 4 9C pixel structures to form a plurality of 6×6 pixel structures of the pixel array, wherein photodiodes of each 6×6 pixel structure configured to sense image data are covered by one of the plurality of color filters having the first color and one of the plurality of color filters having the second color along a first diagonal of each 6×6 pixel structure, wherein photodiodes of each 6×6 pixel structure configured to sense image data are covered by two of the plurality of color filters having the third color along a second diagonal of each 6×6 pixel structure, wherein a pattern of the plurality of color filters over the each 6×6 pixel structure is repeated over the rows and columns of the pixel array.

6. The imaging device of claim 5, wherein the first color is blue, wherein the second color is red, wherein the third color is green.

7. The imaging device of claim 6, wherein a center 2×2 grouping of photodiodes included in each 6×6 pixel structure is coupled to provide phase detection information for the pixel array, wherein photodiodes included in the center 2×2 grouping of photodiodes included in each 6×6 pixel structure that are coupled to provide phase detection information are covered by green or panchromatic color filters.

8. The imaging device of claim 7, further comprising a plurality of current sources coupled to the plurality of bitlines.

9. The imaging device of claim 8, wherein each one of the plurality of current sources is coupled to a respective one of the plurality of bitlines.

10. The imaging device of claim 9, further comprising a plurality of comparators capacitively coupled to the plurality of bitlines.

11. The imaging device of claim 10, further comprising routing circuitry coupled between the plurality of bitlines and the plurality of comparators, wherein the routing circuitry is configured to control which of the plurality of bitlines are capacitively coupled to each one of the plurality of comparators.

12. The imaging device of claim 11, wherein the routing circuitry is configured to capacitively couple each one of a first subgrouping of the plurality of comparators to either a first respective one of the groupings of 3 bitlines per column of the 1×3 pixel circuits in the pixel array or a second respective one of the groupings of 3 bitlines per column of the 1×3 pixel circuits in the pixel array to readout image data from more than one of the photodiodes at a time from the 1×3 pixel circuits that are coupled to each one of the plurality of comparators.

13. The imaging device of claim 12, wherein the 1×3 pixel circuits of the first respective one of the groupings of 3 bitlines are covered by one of the plurality of color filters having the first color, wherein the 1×3 pixel circuits of the second respective one of the groupings of 3 bitlines are covered by one of the plurality of color filters having the second color.

14. The imaging device of claim 13, wherein the routing circuitry is configured to capacitively couple each one of a second subgrouping of the plurality of comparators to either a third respective one of the groupings of 3 bitlines per column of the 1×3 pixel circuits in the pixel array or a fourth respective one of the groupings of 3 bitlines per column of the 1×3 pixel circuits in the pixel array.

15. The imaging device of claim 14, wherein the 1×3 pixel circuits of the third respective one of the groupings of 3 bitlines are covered by one of the plurality of color filters having the third color in a same row of the 1×3 pixel circuits covered by one of the plurality of color filters having the first color, wherein the 1×3 pixel circuits of the fourth respective one of the groupings of 3 bitlines are covered by one of the plurality of color filters having the third color in a same row of the 1×3 pixel circuits covered by one of the plurality of color filters having the second color.

16. The imaging device of claim 11, wherein the routing circuitry is configured to capacitively couple each one of the plurality of comparators to one of the plurality of bitlines that are coupled to one of the center 2×2 grouping of photodiodes included in each 6×6 pixel structure that is coupled to provide phase detection information for the pixel array.

17. The imaging device of claim 11, wherein the routing circuitry is configured to capacitively couple each one of the plurality of comparators to one of the bitlines of one of the groupings of 3 bitlines per column of the 1×3 pixel circuits in the pixel array to readout image data from one of the photodiodes at a time from the 1×3 pixel circuits that are coupled to said one of the bitlines of one of the groupings of 3 bitlines per column of the 1×3 pixel circuits in the pixel array.

18. The imaging device of claim 17, wherein other ones of the bitlines of said one of the groupings of 3 bitlines per column of the 1×3 pixel circuits that are coupled to 1×3 pixel circuits that are not being read out are configured to be idle.

19. An imaging system, comprising:
- a pixel array including:
  - a plurality of 1×3 pixel circuits arranged in rows and columns of the pixel array, wherein each 1×3 pixel circuit includes 3 photodiodes included in a respective column of 1×3 pixel circuits in the pixel array, wherein the 3 photodiodes of each 1×3 pixel circuit included in the respective column of 1×3 pixel circuits in the pixel array are included in a respective 3 rows of the pixel array;
  - a plurality of bitlines coupled to the plurality of 1×3 pixel circuits, wherein the plurality of bitlines is divided into groupings of 3 bitlines per column of the 1×3 pixel circuits in the pixel array, wherein each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines; and
  - a plurality of 9-cell (9C) pixel structures, wherein the plurality of 1×3 pixel circuits is further arranged into groupings of 3 1×3 pixel circuits per 9C pixel structure to form a plurality of 3×3 pixel structures of the pixel array; and a readout circuit coupled to the pixel array to readout signals from the pixel array through the plurality of bitlines, the readout circuit including:

a plurality of current sources coupled to the plurality of bitlines, wherein each one of the plurality of current sources is coupled to a respective one of the plurality of bitlines;

a plurality of comparators capacitively coupled to the plurality of bitlines; and routing circuitry coupled between the plurality of bitlines and the plurality of comparators, wherein the routing circuitry is configured to control which of the plurality of bitlines are capacitively coupled to each one of the plurality of comparators.

20. The imaging system of claim 19, wherein the routing circuitry is configured to capacitively couple each one of a first subgrouping of the plurality of comparators to either a first respective one of the groupings of 3 bitlines per column of the 1×3 pixel circuits in the pixel array or a second respective one of the groupings of 3 bitlines per column of the 1×3 pixel circuits in the pixel array to readout image data from more than one of the photodiodes at a time from the 1×3 pixel circuits that are coupled to each one of the plurality of comparators.

21. The imaging system of claim 20, wherein photodiodes configured to sense image data of the 1×3 pixel circuits of the first respective one of the groupings of 3 bitlines are covered by one of a plurality of color filters of a color filter array having the first color, wherein photodiodes configured to sense image data of the 1×3 pixel circuits of the second respective one of the groupings of 3 bitlines are covered by one of the plurality of color filters having the second color.

22. The imaging system of claim 21, wherein the routing circuitry is configured to capacitively couple each one of a second subgrouping of the plurality of comparators to either a third respective one of the groupings of 3 bitlines per column of the 1×3 pixel circuits in the pixel array or a fourth respective one of the groupings of 3 bitlines per column of the 1×3 pixel circuits in the pixel array.

23. The imaging system of claim 22, wherein photodiodes configured to sense image data of the 1×3 pixel circuits of the third respective one of the groupings of 3 bitlines are covered by one of the plurality of color filters having a third color in a same row of the 1×3 pixel circuits covered by one of the plurality of color filters having the first color, wherein photodiodes configured sense image data of the 1×3 pixel circuits of the fourth respective one of the groupings of 3 bitlines are covered by one of the plurality of color filters having the third color in a same row of the 1×3 pixel circuits covered by one of the plurality of color filters having the second color.

24. The imaging system of claim 19, further comprising a color filter array disposed over photodiodes the pixel array configured to sense image data, wherein the color filter array comprises:

a plurality of color filters having a first color;

a plurality of color filters having a second color; and a plurality of color filters having a third color, wherein photodiodes of each one of the plurality of 9C pixel structures configured to sense image data are covered by one of the plurality of color filters having the first color, the plurality of color filters having the second color, or the plurality of color filters having the third color.

25. The imaging system of claim 24, wherein the plurality of 9C pixel structures is arranged into groupings of 4 9C pixel structures to form a plurality of 6×6 pixel structures of the pixel array, wherein photodiodes of each 6×6 pixel structure configured to sense image data are covered by one of the plurality of color filters having the first color and one of the plurality of color filters having the second color along a first diagonal of each 6×6 pixel structure, wherein photodiodes of each 6×6 pixel structure configured to sense image data are covered by two of the plurality of color filters having the third color along a second diagonal of each 6×6 pixel structure, wherein a pattern of the plurality of color filters over the each 6×6 pixel structure is repeated over the rows and columns of the pixel array.

26. The imaging system of claim 25, wherein the first color is blue, wherein the second color is red, wherein the third color is green.

27. The imaging system of claim 26, wherein a center 2×2 grouping of photodiodes included in each 6×6 pixel structure is coupled to provide phase detection information for the pixel array, wherein photodiodes included in the center 2×2 grouping of photodiodes included in each 6×6 pixel structure that are coupled to provide phase information are covered by green or panchromatic color filters.

28. The imaging system of claim 27, wherein the routing circuitry is configured to capacitively couple each one of the plurality of comparators to one of the plurality of bitlines that are coupled to one of the center 2×2 grouping of photodiodes included in each 6×6 pixel structure that is coupled to provide phase detection information for the pixel array.

29. The imaging system of claim 19, wherein the routing circuitry is configured to capacitively couple each one of the plurality of comparators to one of the bitlines of one of the groupings of 3 bitlines per column of the 1×3 pixel circuits in the pixel array to readout image data from one of the photodiodes at a time from the 1×3 pixel circuits that are coupled to said one of the bitlines of one of the groupings of 3 bitlines per column of the 1×3 pixel circuits in the pixel array.

30. The imaging system of claim 29, wherein other ones of the bitlines of said one of the groupings of 3 bitlines per column of the 1×3 pixel circuits that are coupled to 1×3 pixel circuits that are not being read out are configured to be idle.

* * * * *